US010528730B2

(12) United States Patent
Yamane et al.

(10) Patent No.: US 10,528,730 B2
(45) Date of Patent: Jan. 7, 2020

(54) ANALYSIS DEVICE, ANALYSIS METHOD, AND STORAGE MEDIUM IN WHICH ANALYSIS PROGRAM IS RECORDED

(71) Applicant: NEC Corporation, Minato-ku, Tokyo (JP)

(72) Inventors: Masato Yamane, Tokyo (JP); Yuki Ashino, Tokyo (JP); Yoichiro Morita, Tokyo (JP); Masafumi Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 15/319,431

(22) PCT Filed: Jun. 24, 2015

(86) PCT No.: PCT/JP2015/003179
§ 371 (c)(1),
(2) Date: Dec. 16, 2016

(87) PCT Pub. No.: WO2015/198600
PCT Pub. Date: Dec. 30, 2015

(65) Prior Publication Data
US 2017/0147817 A1 May 25, 2017

(30) Foreign Application Priority Data

Jun. 26, 2014 (JP) .................................. 2014-131309

(51) Int. Cl.
*G06F 21/00* (2013.01)
*G06F 21/56* (2013.01)
(Continued)

(52) U.S. Cl.
CPC ........ *G06F 21/562* (2013.01); *G06F 11/3037* (2013.01); *G06F 11/34* (2013.01); *G06F 2221/034* (2013.01)

(58) Field of Classification Search
None
See application file for complete search history.

(56) References Cited

U.S. PATENT DOCUMENTS 5,915,262 A * 6/1999 Bridgers ............. G06F 12/0802
711/118
7,693,877 B1 * 4/2010 Zasman ................ G06F 16/185
707/707
(Continued)

FOREIGN PATENT DOCUMENTS

JP  S63-298542 A  12/1988
JP  H01-320547 A  12/1989
(Continued)

OTHER PUBLICATIONS

Singapore Office Action for SG Application No. 11201610809Y dated Oct. 3, 2017.
(Continued)

*Primary Examiner* — Alexander Lagor

(57) ABSTRACT

Provided is an analysis apparatus including a first storage device configured to store data, and a processing circuitry that is configured to control the own apparatus to function as: a dispatcher that is communicably connected to an analysis target device that performs operational processing by use of a processor and a memory unit, and generates collection target data for reproducing at least part of a state of the operational processing in the analysis target device, in accordance with data being transmitted and received between the processor and the memory unit; a data mapper that assigns, to one or more areas included in the collection target data, tag information for identifying the area; and a data writer that saves the one or more areas into the first storage device in accordance with a first policy defining a procedure of saving the collection target data into the first storage device.

18 Claims, 23 Drawing Sheets

(51) Int. Cl.
*G06F 11/34* (2006.01)
*G06F 11/30* (2006.01)

(56) References Cited

U.S. PATENT DOCUMENTS

| | | |
|---|---|---|
| 2008/0016570 A1 | 1/2008 | Capalik |
| 2010/0125554 A1 | 5/2010 | Jennings et al. |
| 2011/0185430 A1 | 7/2011 | Sallam |
| 2014/0181975 A1* | 6/2014 | Spernow .............. G06F 21/562 726/23 |

FOREIGN PATENT DOCUMENTS

| | | |
|---|---|---|
| JP | H04-346139 A | 12/1992 |
| JP | H07-006061 A | 1/1995 |
| JP | 2006-178521 A | 7/2006 |
| JP | 2007-173931 A | 7/2007 |
| JP | 2008-191796 A | 8/2008 |
| JP | 2013-240114 A | 11/2013 |
| WO | 2012/027669 A1 | 3/2012 |

OTHER PUBLICATIONS

International Search Report for PCT Application No. PCT/JP2015/003179, dated Sep. 29, 2015.
English translation of Written opinion for PCT Application No. PCT/JP2015/003179.
Holger Macht, "Live Memory Forensics on Android with Volatility", Diploma Thesis in Computer Science, Chair of Computer Science 1 (IT-Security), Friedrich-Alexander University Erlangen-Nuremberg, Jan. 2013.
Nilay et al, "Volatile Memory Based Forensic Artifacts & Analysis", International Journal for Research in Applied Science and Engineering Technology (IJRASET), Feb. 2014, vol. 2 Issue I, ISSN: 2321-9653.
Extended European Search Report for EP Application No. EP15811550.1 dated Mar. 2, 2018.

* cited by examiner

Fig. 15

HIGH-SPEED REPOSITORY 1501

| DISPATCHER ID | TAG INFORMATION 701 | RECORD TIMING INFORMATION 702 | SAVE-TARGET DATA 703 |
|---|---|---|---|
| DISPATCHER ID1 | A | TIME 1 | DATA A1 |
| DISPATCHER ID1 | A | TIME 2 | DATA A2 |
| DISPATCHER ID1 | A | TIME 3 | DATA A3 |
| DISPATCHER ID1 | A | TIME 4 | DATA A4 |
| ... | ... | ... | ... |
| DISPATCHER ID1 | A | TIME 9 | DATA A9 |
| DISPATCHER ID1 | A | TIME 10 | DATA A10 |
| DISPATCHER ID2 | B | TIME 10 | DATA B1 |
| DISPATCHER ID3 | C | TIME 6 | DATA C6 |
| DISPATCHER ID3 | C | TIME 7 | DATA C7 |
| ... | ... | ... | ... |
| DISPATCHER ID3 | C | TIME 10 | DATA C10 |

ANALYSIS DEVICE, ANALYSIS METHOD, AND STORAGE MEDIUM IN WHICH ANALYSIS PROGRAM IS RECORDED

This application is a National Stage Entry of PCT/JP2015/003179 filed on Jun. 24, 2015, which claims priority from Japanese Patent Application 2014-131309 filed on Jun. 26, 2014, the contents of all of which are incorporated herein by reference, in their entirety.

TECHNICAL FIELD

The present invention relates to an analysis device and the like, being capable of analyzing a state of analysis target equipment (device), by saving and reproducing data representing a state of the analysis target equipment.

BACKGROUND ART

In recent years, malicious acts such as unauthorized intrusion into an information processing apparatus, information leakage, and destruction of electronic data, caused by a malicious program (hereinafter referred to as "malware") such as a virus, have occurred in information processing apparatuses such as a computer.

Various events (hereinafter, referred to as "cyber incidents" or "incidents") caused by such malicious acts may occur in an information processing apparatus and the like. As a technique of investigating a cause of such an event being occurred, for example, there is known techniques for analyzing data remaining in a non-volatile storage device (such as a hard disk) constituting an information processing apparatus, a communication record, and the like. Hereinafter, various types of investigations of cyber incidents may be referred to as "digital forensics" or "forensics."

Among investigation techniques related to digital forensics, there is known limitations about the aforementioned investigation technique of analyzing remaining data in a non-volatile storage device and a communication record, as following.

First, it takes time to analyze record data remaining in the non-volatile storage device, and a communication record. That causes a problem in quick response to an incident. More specifically, for example, when analyzing a log and a communication record in an information processing apparatus, acquisition and analysis of a vast amount of complex log data are required. Since it takes time to collect and analyze log data, it may be difficult to respond quickly when an incident occurs.

Further, in recent years, malware itself and various types of related data may be recorded in the non-volatile storage device in an encrypted form. When recorded data remaining in the non-volatile storage device are encrypted, it is often very difficult to decrypt the data, and analysis may become practically difficult.

Similarly, for example, when malware performs various types of communication processing by using an advanced cryptographic method such as public-key cryptography, it is difficult to decrypt collected communication data.

Further, malware itself may be configured to be active only in a volatile memory in an information processing apparatus, and configured not to be stored in the non-volatile storage device. In this case, it is impossible to detect the malware by analyzing remaining data in the non-volatile storage device. Additionally, since a timing and a period of an activity of the malware is unknown, sufficient information may not be obtained even by analyzing record data at a specific timing in the non-volatile storage device.

Further, when integrity of data remaining in the non-volatile storage device is impaired due to falsification, deletion, or the like by malware, useful data as an analysis target may not remain.

Accordingly, a forensics technique of acquiring various types of information while a system composed of an information processing apparatus and the like is in an operating state, and performing various types of investigation and analysis of the collected information, is recently used. Such an investigation technique is hereinafter referred to as a "live forensics" technique in the present application. In such a live forensics technique, for example, data stored in a volatile storage device (such as a memory) in an information processing apparatus in operation are included in an investigation target.

By use of such a live forensics technique, for example, a moment at which malware is active (or, almost simultaneously, status in which malware is active) in an information processing apparatus may be captured. Further, since data stored in the volatile storage device can be acquired, an encryption key loaded on memory may be acquired. In this case, various types of cryptographic communication and encrypted data may be decrypted. Additionally, there is possibility for analyzing malware being not related to input and output with respect to a non-volatile storage device (that is, not leaving a trace in a non-volatile storage device).

The following patent literatures are disclosed, with regard to technologies used in the forensics technique or the live forensics technique as described above.

PTL 1 discloses a technology of detecting unauthorized intrusion into a computer network. The technology disclosed in PTL 1 induces an attacker into a virtual decoy host provided in a decoy network device, and generates attack identification information by recording a behavior of the attacker in the host. The technology disclosed in PTL 1 saves the generated attack identification information as forensic data, and generates an attack signature applied to an intrusion prevention system, in accordance with the forensic data.

PTL 2 and PTL 3 below disclose technologies of acquiring various types of data stored in a volatile main memory in an information processing apparatus. These technologies are not directly related to the aforementioned live forensics technique.

PTL 2 discloses a technology for debugging a computer program, and for reproducing a memory state at any time point in equipment in which the program is executed. The technology disclosed in PTL 2 acquires all data transmitted and received through a bus connecting a processor and a memory device in the debug target equipment, and stores bus access information arranging the acquired data on a time-series basis. The technology disclosed in PTL 2 reproduces a memory state of the debug target equipment at a specific time point, by acquiring a memory state at a timing when failure has occurred, and successively and retroactively applying data stored in the bus access information to the memory state.

PTL 3 discloses a technology of converting a physical address of data transmitted and received through a bus connecting a processor and a memory, into a logical address and presenting the converted logical address, in accordance with all data transmitted and received through the bus, and address conversion information included in the processor.

PTL 4 and PTL 5 below discloses a forensics technique relating to analyzing remaining data in a non-volatile storage device, and a communication record.

PTL 4 discloses a technology of assigning a hash key and time information to every communication packet acquired at a predetermined connecting point in a communication network, and saving the packet data. When a failure occurs, the saved packet data are analyzed.

PTL 5 discloses a technology of specifying a terminal in which an anomaly activity having been occurred, by analyzing communication data transmitted and received in a communication network. A cause of the anomaly activity is analyzed by preserving evidence of a record of a hard disk in the specified terminal.

CITATION LIST

Patent Literature

[PTL1] Japanese Unexamined Patent Application Publication No. 2013-240114
[PTL2] Japanese Unexamined Patent Application Publication No. 2008-191796
[PTL3] Japanese Unexamined Patent Application Publication No. H07-006061
[PTL4] Japanese Unexamined Patent Application Publication No. 2007-173931
[PTL5] Japanese Unexamined Patent Application Publication No. 2006-178521

SUMMARY OF INVENTION

Technical Problem

In a case of using the live forensics technique as described above, for example, when various types of monitoring programs and the like (may be hereinafter referred to as "agents") are executed in analysis target equipment, execution of the programs may be detected by malware. Malware that detects execution of an agent may suspend an activity of the malware itself, and may erase a trace of an activity including the malware itself.

As described above, when malware itself takes a workaround to avoid analysis of the malware itself, it becomes difficult to analyze the malware. Accordingly, an agentless live forensics technology which does not execute an agent in analysis target equipment is required.

In a live forensics technique, a content of a memory space and the like in analysis target equipment may be acquired in order to analyze an activity state of malware. More specifically, the live forensics technique, for example, appropriately saves data representing a state of analysis target equipment, such as a memory space in the analysis target equipment, at a specific time point. Then, when an incident occurs, a behavior of malware is analyzed by reproducing (restoring) the saved data.

In this case, data representing a state of the analysis target equipment may include, for example, a content of a memory space in the analysis target equipment and data (such as a register) holding an operating state of an operational processing device included in the analysis target equipment.

As described above, an activity timing of malware is unknown in many case. In order to capture such an activity of malware, it is desirable that as many contents of a memory space and the like as possible can be acquired as a time-series data. However, in recent information processing apparatuses, a processing speed has been accelerated and a memory capacity has been expanded remarkably. Therefore, a vast amount of high-speed storage devices are required to, for example, continuously acquire and save a content of a memory space. Such a high-speed storage device may be hereinafter referred to as a "high-speed storage."

For example, a solid state drive (SSD) composed of a non-volatile semiconductor storage element, a random access memory (RAM) disk composed of a volatile semiconductor storage element, and a storage device employing a redundant arrays of inexpensive disks (RAID) configuration, may be considered as such a high-speed storage. However, in order to provide a sufficient recording speed, a unit cost per capacity becomes relatively high regardless of which configuration is employed. Accordingly, it is not practical to provide for a high-speed storage capable of continuously recording a content of a memory space in analysis target equipment for a long period.

Further, input and output with respect to a memory space in analysis target equipment occurs more frequently than, for example, input and output with respect to a file system or a communication network. As described above, since an activity timing of malware is unknown in many case, it may be difficult to analyze an activity of malware merely by, for example, capturing input and output with respect to a memory space at a specific timing.

Consequently, a live forensics technology is required to acquire as much information by which an activity status of malware in analysis target equipment can be analyzed as possible, by use of a limited computer resource. Further, the live forensics technology is required to be able to acquire information by which a state of analysis target equipment can be reproduced, in order to analyze an activity status of malware. Such a computer resource includes, for example, the aforementioned high-speed storage and a controller capable of controlling the storage. Further, the information by which an activity status of malware can be analyzed includes, for example, data representing a state of analysis target equipment such as a content of a memory space. When a content of a memory space at a specific timing can be analyzed by use of data representing a state of the analysis target equipment, the content of the memory space in the analysis target equipment may be considered reproducible.

The technology disclosed in PTL 1 investigates a memory segment of a virtual decoy host in order to investigate an attacker activity in the virtual decoy host. However, the technology disclosed in PTL 1 merely traces and investigates an execution process of malware, and is not a technology that can reproduce a memory space.

Further, the technologies disclosed in PTL 2 and PTL 3 are configured to acquire all data transmitted and received on a bus, and require a large number of high-speed storages.

Further, the technologies disclosed in PTL 4 and PTL 5 assume a record remaining in a communication packet and a hard disk as a main analysis target, and cannot be applied to a situation in which a live forensics technology is required.

The present invention is made in consideration of the situation as described above. That is, a main object of the present invention is to provide an analysis device and the like, being capable of efficiently recording at least part of data representing a state of analysis target equipment acquired from the analysis target equipment, into a storage device with a certain capacity, in accordance with a policy.

Solution to Problem

To achieve an above described objective, an analysis apparatus according to one aspect of the present invention includes: a dispatcher that is configured to be communicably connected to an analysis target device that performs operational processing by use of a processor and a memory unit, which is communicably connected to the processor, and to generate collection target data for reproducing at least part of a state of the operational processing in the analysis target device, in accordance with data being transmitted and received between the processor and the memory unit; a data mapper that is configured to assign, to one or more areas included in the collection target data, tag information for identifying the area; and a data writer that is configured to save the one or more areas into a first storage device with a specific storage capacity, in accordance with a first policy defining, by use of the tag information, a procedure of saving the collection target data into the first storage.

An analysis method according to another aspect of the present invention includes, generating collection target data for reproducing at least part of a state of operational processing in an analysis target device, in accordance with data being transmitted and received between a processor and a memory unit being communicably connected to the processor in the analysis target device that performs operational processing by use of the processor and the memory unit; assigning, with respect to one or more areas included in the collection target data, tag information for identifying the area; and saving the one or more areas into a first storage device with a specific storage capacity, in accordance with a first policy defining, by use of the tag information, a procedure of saving the collection target data into the first storage device.

The objective is also achieved by a computer program and a computer-readable storage medium in which the computer program is stored (recorded), that provide, by a computer, an analysis device including the aforementioned configuration, and the corresponding analysis method.

Advantageous Effects of Invention

The present invention is able to efficiently record at least part of data representing a state of analysis target equipment acquired from the analysis target equipment, into a storage device with a specific capacity, in accordance with a policy. In other words, the present invention is able to save a larger amount of data, by which a state of analysis target equipment can be reproduced, by use of a storage device with a limited storage capacity.

BRIEF DESCRIPTION OF DRAWINGS

FIG. 15 is a diagram illustrating a specific example of saved data saved in a high-speed repository, according to the second modified example of the first example embodiment of the present invention.

DESCRIPTION OF EMBODIMENTS

Next, the example embodiments of the present invention will be described in detail with reference to the drawings. Configurations described in the following example embodiments are simply exemplifications, and the technical scope of the present invention is not limited thereto.

First Example Embodiment

Figure 1:
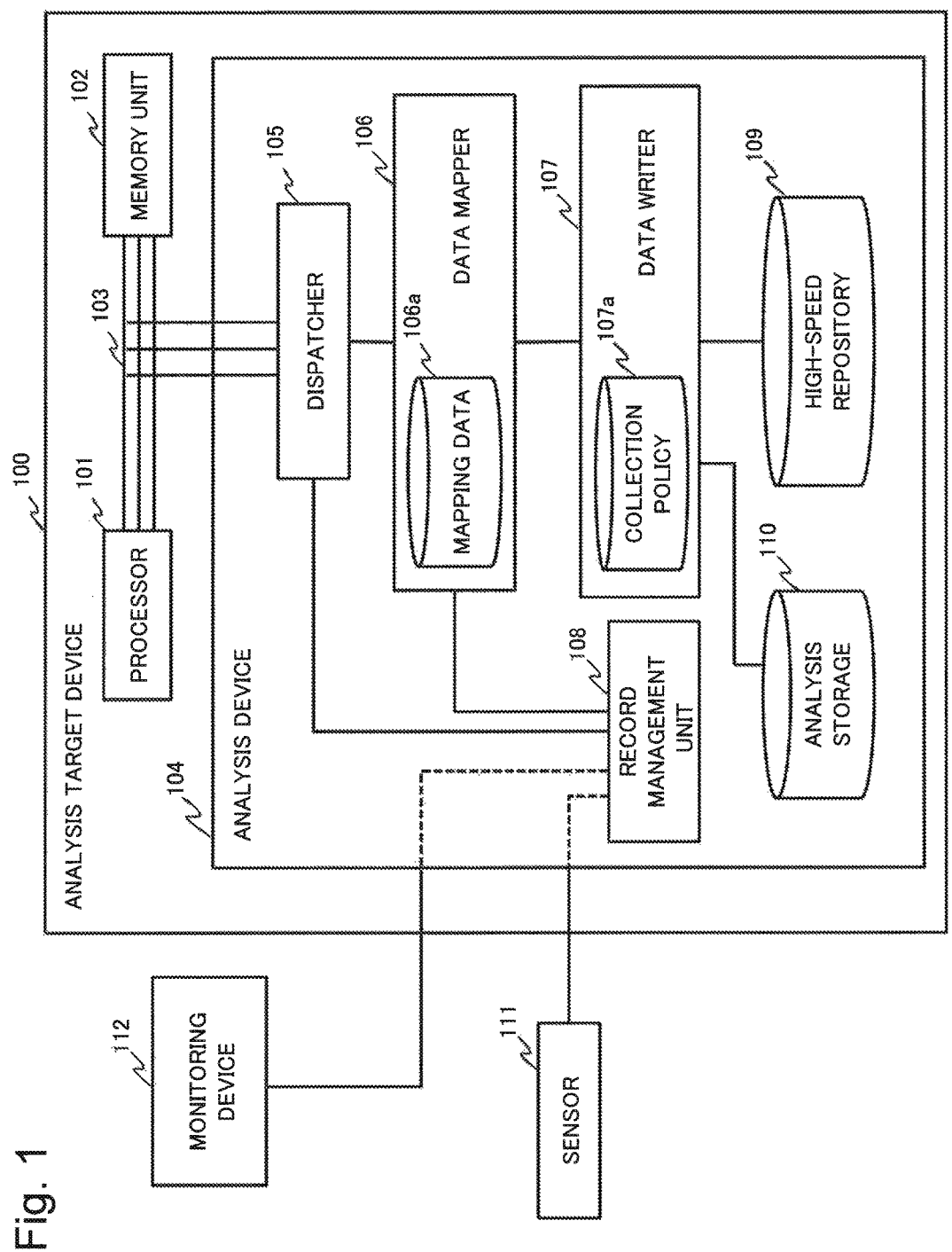
FIG. 1 is a block diagram exemplifying functional configurations of an analysis device and an analysis target device, according to a first example embodiment of the present invention.
Figure 2:
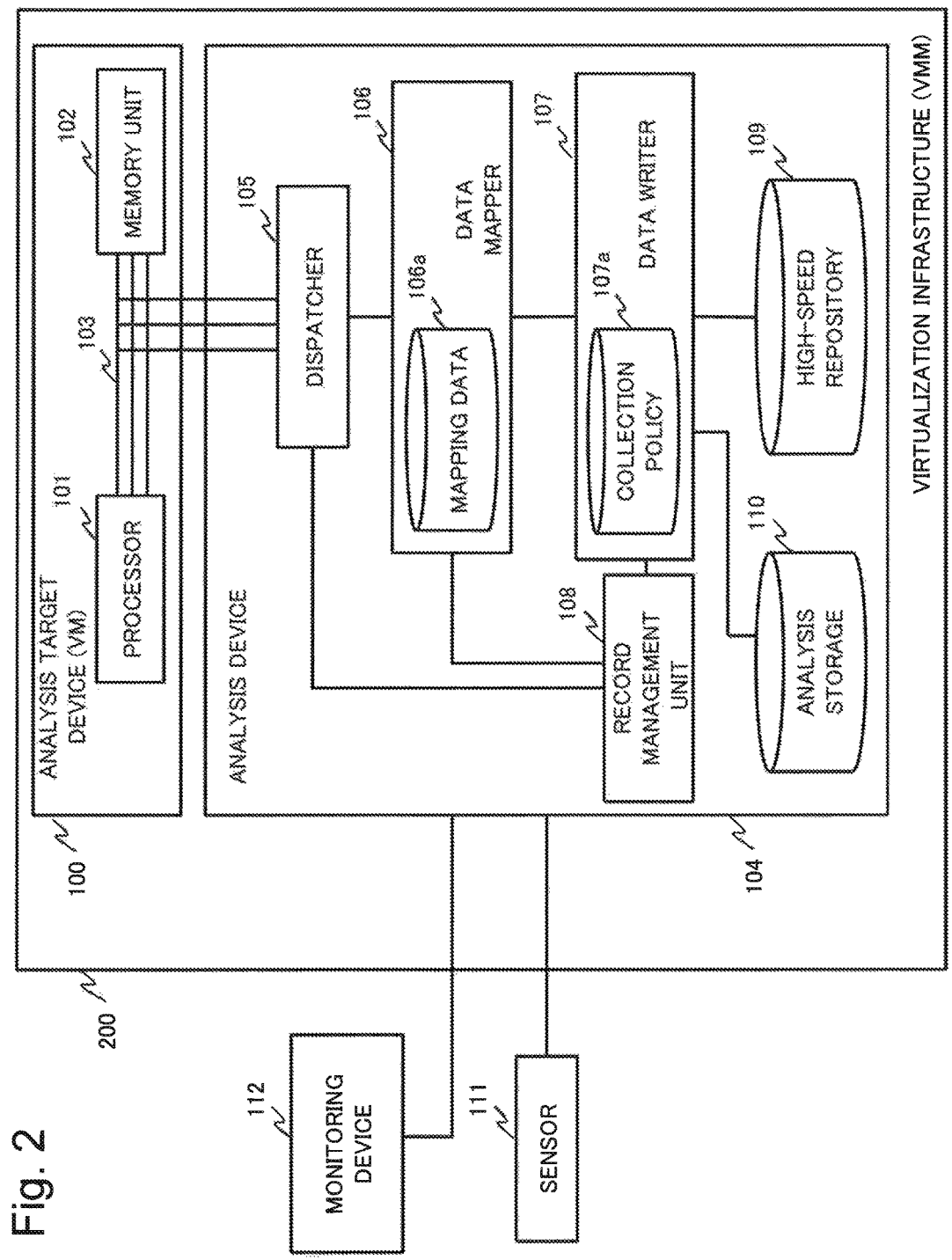
FIG. 2 is a block diagram exemplifying configurations of an analysis device and an analysis target device, according to the first example embodiment of the present invention implemented in a virtualization environment.

A first example embodiment of the present invention will be described below. An analysis device according to the present example embodiment will be described with reference to FIGS. 1 and 2. FIG. 1 is a block diagram exemplifying a functional configuration of an analysis device according to the present example embodiment. FIG. 2 is a diagram illustrating a specific example of an analysis device according to the present example embodiment implemented at least partially using a software program (computer program) in a virtualization environment configured by use of any virtualization infrastructure. While a configuration in which an analysis device 104 is provided as part of an analysis target device 100 is exemplified in FIG. 1, the present example embodiment is not limited to the configuration. The analysis target device 100 and the analysis device 104 may be provided as separate devices, as exemplified in FIG. 2.

The analysis target device 100 includes a processor 101 and a memory unit 102 communicably connected to the processor 101 through a communication bus 103. Such an analysis target device 100 may be an information processing apparatus such as a computer composed of physical hardware. Further, as exemplified in FIG. 2, such an analysis target device 100 may be a virtual computer (virtual machine (VM)) provided in a virtualization infrastructure in which various types of hardware such as an information processing apparatus can be virtualized. In this case, the analysis target device 100 may be implemented as a VM provided in the virtualization infrastructure. Such a VM is executed in, for example, a VMM 200 which is a virtual machine monitor (VMM) having a function of controlling an operation of the VM. A virtual device constituting the VM described above may be hereinafter referred to as a virtual device.

The processor 101 is a central processing unit (CPU) or a micro processing unit (MPU), that can execute various types of operational processing. For example, by reading various types of data and a program (computer program) stored in the memory unit 102, the processor 101 performs processing implemented in the program. Such a processor 101 includes state-holding data representing a state of operational processing in the processor 101. The state-holding data may be, for example, data stored in a register, a memory management unit (MMU) (neither is illustrated), and the like included in the processor 101.

The processor 101 may be a physical processor composed of hardware such as various types of logic circuits and integrated circuits. As exemplified in FIG. 2, the processor 101 may be a virtual processor (virtual CPU) in a virtualization infrastructure in which the hardware can be virtualized.

A value of a register, an MMU, and the like included in the processor 101 according to the present example embodiment may be acquired or set externally. For example, when the processor 101 is composed of physical hardware, a value held in a register, an MMU, and the like may be input and output through a specific input-output port or the like in the hardware. Such a specific input-output port may include, for example, a port connected to a specific pin used for hardware debugging.

Further, when the processor 101 is configured as a virtual processor, a value held in a register, an MMU, and the like may be externally input and output through a function provided by a virtualization infrastructure and data provided by the virtualization infrastructure. The function provided by the virtualization infrastructure may be provided as, for example, a specific application programming interface (API). Further, the data provided by the virtualization infrastructure may include, for example, data holding a register value of a virtual CPU.

A known technology may be appropriately used as a method providing the processing, depending on a specific configuration of the processor 101 and the like, and therefore detailed description about the method is omitted.

The memory unit 102 functions as, for example, a main memory in the analysis target device, and, as described above, stores various types of programs and data, being processed in the processor 101. Such a memory unit 102 may be a physical memory device composed of specific hardware (such as an integrated circuit). For example, such a memory device may include a dynamic random access memory (DRAM) composed of a dual inline memory module (DIMM). Further, as exemplified in FIG. 2, the memory unit 102 may be a virtual memory device provided in the aforementioned certain virtualization infrastructure.

With regard to the memory unit 102 according to the present example embodiment, a stored content (stored data) stored in the memory unit 102 may be externally acquired or set. More specifically, when the memory unit 102 is composed of physical hardware, data stored in the memory unit 102 can be acquired by acquiring data transmitted and received on the communication bus 103 connecting the processor 101 and the memory unit 102. Further, data stored in the memory unit 102 may be acquired by outputting (memory dumping) the entire memory area in the memory unit 102 at a specific timing. A stored content stored in the memory unit 102 may be externally set by writing back the acquired data into the memory unit 102 through the communication bus 103 or the like. A storage area in the memory unit 102 may be hereinafter referred to as a "memory space."

When the memory unit 102 is configured as a virtual memory device, data stored in the memory unit 102 may be acquired or set through a function provided by a virtualization infrastructure (such as a specific API) or data provided by the virtualization infrastructure. The data provided by the virtualization infrastructure may include, for example, information (data) which can specify a saved area of data stored in the virtual memory unit. A known technology may be appropriately used for a specific method providing such processing, depending on a specific configuration of the memory unit 102, and therefore detailed description is omitted.

In the analysis target device 100, there may be a case that input and output between the processor 101 or the memory unit 102, and a peripheral device (unillustrated) are performed through a specific area in the memory unit 102. Specifically, such input and output are executed by a method such as memory-mapped input output (MMIO). In this case, data input and output with respect to a memory area used in such MMIO can be externally acquired, similarly to the above. In other words, input-output data communicated with the peripheral device (unillustrated) can be acquired by acquiring data transmitted and received between the processor 101 and the memory unit 102.

The communication bus 103 is a communication line communicably connecting at least the processor 101 and the memory unit 102. A configuration of the communication bus 103 may be appropriately selected depending on configurations of the processor 101 and the memory unit 102. The communication bus 103 according to the present example embodiment is not necessarily limited to a communication line based on bus connection, and, for example, may connect the processor 101 and the memory unit 102 on a peer-to-peer basis. Further, when the processor 101 and the memory unit 102 are configured as virtual hardware provided in the virtualization infrastructure, the communication bus 103 may be provided as a virtual communication bus implemented by any suitable method. Further, the communication bus 103 does not necessarily have to be implemented by use of a virtualized communication line. For example, the communication bus 103 may be implemented by use of any method capable of simply transmitting and receiving data between the processor 101 and the memory unit 102.

A configuration of the analysis device 104 capable of analyzing a state of operational processing in the analysis target device 100 configured as described above, will be described.

The analysis device 104 according to the present example embodiment includes a dispatcher 105 communicably connected to the processor 101 and the memory unit 102. The analysis device 104 includes a data mapper 106 that is configured to process data acquired by the dispatcher 105. Further, the analysis device 104 includes a data writer 107 that is configured to save data processed by the data mapper 106 into a high-speed repository 109 (first storage device), in accordance with a policy defining a method of saving the data.

The analysis device 104 according to the present example embodiment includes a record management unit 108 capable of controlling an operation of the data writer 107. The analysis device 104 includes an analysis storage 110 (second storage device) capable of saving data duplicated from data saved in the high-speed repository 109, for a long period.

Further, the analysis device 104 according to the present example embodiment may be communicably connected to a sensor 111 capable of detecting an incident affecting an operation of the analysis target device 100, and a monitoring device 112 notifying various types of requests to the analysis device 104. In the present example embodiment, it may be appropriately selected whether or not to provide the monitoring device 112 and the sensor 111.

Next, each component of the analysis device 104 configured as described above will be described.

In the following, the dispatcher 105 according to the present example embodiment will be described. The dispatcher 105 according to the present example embodiment is communicably connected to the processor 101 and the memory unit 102 in the analysis target device 100, and acquires data being transmitted and received (hereinafter referred to as "transmission-reception target data") between the processor 101 and the memory unit 102. Further, the dispatcher 105 according to the present example embodiment is communicably connected to the data mapper 106 (to be described later) and notifies the acquired data to the data mapper 106. The dispatcher 105 according to the present example embodiment may also be communicably connected to the record management unit 108.

Specifically, the dispatcher 105 may acquire the transmission-reception target data through, for example, the communication bus 103. When the processor 101 and the memory unit 102 are implemented as virtual devices, the dispatcher 105 may acquire the transmission-reception target data by use of various types of functions provided by a virtualization infrastructure and the like, as described above.

The dispatcher 105 according to the present example embodiment does not necessarily have to acquire the transmission-reception target data through the communication bus 103. As described above, data and the like held by the processor 101 and the memory unit 102 according to the present example embodiment may be externally acquired or set. Accordingly, the dispatcher 105 may acquire data corresponding to transmission-reception target data, by directly acquiring data respectively held by the processor 101 or the memory unit 102, by the method as described above.

The dispatcher 105 according to the present example embodiment generates collection target data, which is data by which a state of operational processing in the analysis target device 100 can be reproduced, in accordance with the acquired transmission-reception target data.

The state of operational processing in the analysis target device 100 according to the present example embodiment may be represented by use of at least one of stored data stored in the memory unit 102, and state-holding data in the processor 101. The collection target data are not limited to data which can completely reproduce a state of operational processing in the analysis target device 100, and include data which can reproduce part of a state of operational processing.

Specifically, the collection target data according to the present example embodiment include at least stored data stored in the memory unit 102 at a specific time point. Such stored data may include information (such as an address) by which an area in which the stored data are stored in the memory unit 102 can be specified. Further, the collection target data may include data (such as a register value) by which an operating state of the processor 101 at a specific time point can be specified.

For example, by acquiring (capturing) all transmission-reception target data transmitted and received between the processor 101 and the memory unit 102, from a specific starting point as a time-series data, the dispatcher 105 is able to construct stored data stored in the memory unit 102 at a certain time point after such a starting point. Further, by acquiring a duplicate (memory dump) of stored data stored in the memory unit 102 at a certain time point, the dispatcher 105 is able to construct the stored data stored in the memory unit 102 at the certain time point. Thus, the dispatcher 105 may generate the collection target data so as to include the stored data being acquired by such a way. Further, the dispatcher 105 may acquire state-holding data from the processor 101, and generate the collection target data so as to include such state-holding data.

As described above, when the analysis target device 100 performs MMIO, communication data between a peripheral device (unillustrated) of the analysis target device 100, and the processor 101 or the memory unit 102 can also be acquired. Accordingly, the dispatcher 105 is able to indirectly acquire a processing state of the peripheral device (unillustrated) of the analysis target device 100.

The dispatcher 105 may generate the collection target data at specific intervals, in accordance with a certain sampling setting. In this case, for example, the record management unit 108 (to be described later) may set a sampling interval to the dispatcher 105. Such a sampling interval may be appropriately set by use of, for example, a clock count of the processor 101, a clock count of the bus 103, or a certain time interval. When the sampling interval is set, the dispatcher 105 may acquire the transmission-reception target data at the sampling intervals, and generate collection target data, in accordance with the acquired transmission-reception target data.

Even when the sampling interval is set, the dispatcher 105 may generate the collection target data regardless of such sampling timing, for example, in accordance with a request from the record management unit 108 (to be described later).

The dispatcher 105 configured as described above is able to adjust an amount of collection target data generated per unit of time, by adjusting the sampling interval. Consequently, a data size saved per unit of time into the high-speed repository 109 (to be described later) can be adjusted. Further, the dispatcher 105 is able to generate appropriately collection target data, in accordance with a request from the record management unit 108. Therefore, for example, the dispatcher 105 is able to generate quickly collection target data when an incident occurs.

The dispatcher 105 may assign information (collection timing information) indicating a timing (time point) or a time at which transmission-reception target data, being source of collection target data, are acquired, to the collection target data.

For example, the dispatcher 105 configured as described above generates the collection target data as time-series data, and notifies the generated collection target data to the data mapper 106 (to be described later).

The dispatcher 105 may start generation of the collection target data in accordance with, for example, a request from the record management unit 108 (to be described later), or start generation of the collection target data automatically when the analysis device 104 is activated.

In the following, the data mapper 106 according to the present example embodiment will be described. The data mapper 106 according to the present example embodiment is communicably connected to the dispatcher 105, and accepts collection target data generated by the dispatcher 105. Then, the data mapper 106 processes the collection target data, in accordance with mapping data 106a. In this case, the data mapper 106 may acquire collection target data from the dispatcher 105, or the dispatcher 105 may supply (notify) collection target data to the data mapper 106.

Figure 3:
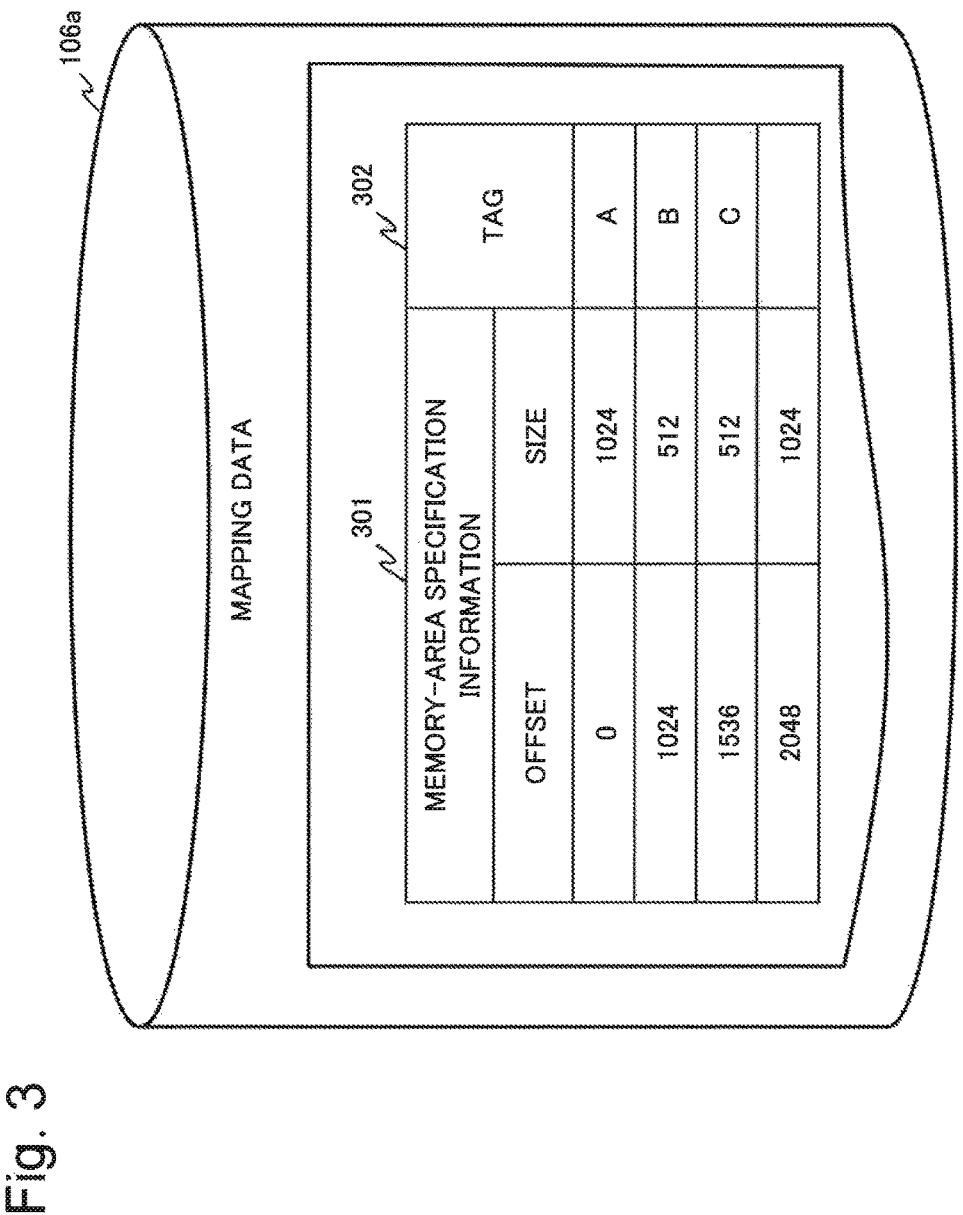
FIG. 3 is a diagram illustrating a specific example of mapping data according to the first example embodiment of the present invention.

The mapping data 106a according to the present example embodiment will be described below with reference to drawings. FIG. 3 is a diagram illustrating a specific example of the mapping data 106a according to the present example embodiment.

Information (memory-area specification information 301) which indicates a storage area of the memory unit 102, in which stored data included in collection target data accepted from the dispatcher 105 are stored, is set to the mapping data 106a. Stored data included in collection target data are divided for each specific storage area (range of a storage area) in the memory unit 102, in accordance with the memory-area specification information 301. More specifically, stored data included in collection target data are divided for each of one or more storage areas (ranges of storage areas) in the memory unit 102 in which the stored data are stored.

Further, identification information (tag information 302) assigned to a storage area specified by the memory-area specification information 301 is set to the mapping data 106a.

The mapping data 106a according to the present example embodiment includes the memory-area specification information 301 associated with the tag information 302. That is, stored data divided into one or more areas by the memory-area specification information 301 can be assigned with the tag information 302 by which the area can be identified, by use of the mapping data 106a according to the present example embodiment.

As exemplified in FIG. 3, the memory-area specification information 301 may include an offset address of a memory space in the memory unit 102 and a size from the offset address, as information for specifying a specific storage area in the memory space. The size from the offset address represents a size of the specific storage area in the memory space.

Figure 4:
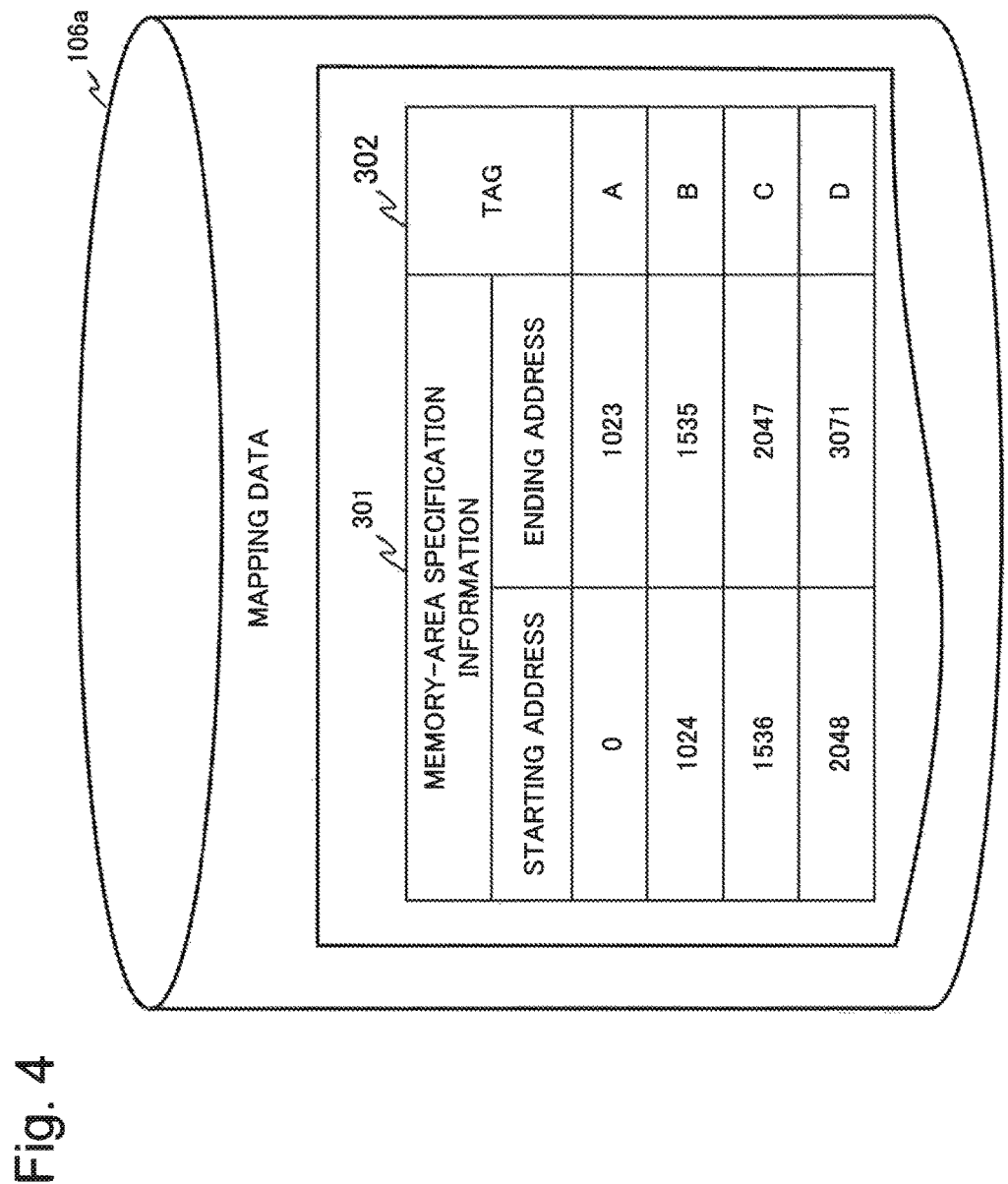
FIG. 4 is a diagram illustrating another specific example of mapping data according to the first example embodiment of the present invention.

Further, as exemplified in FIG. 4, the memory-area specification information 301 may include a starting address and an ending address indicating a specific location in a memory space in the memory unit 102, as information for specifying a specific storage area in the memory space.

By referring to the mapping data 106a, the data mapper 106 according to the present example embodiment assigns tag information to stored data included in collection target data accepted from the dispatcher 105. Specifically, as exemplified in FIG. 5, for each storage area specified by the memory-area specification information 301, the data mapper 106 assigns tag information 302 associated with the storage area to stored data 501 included in collection target data.

Figure 5:
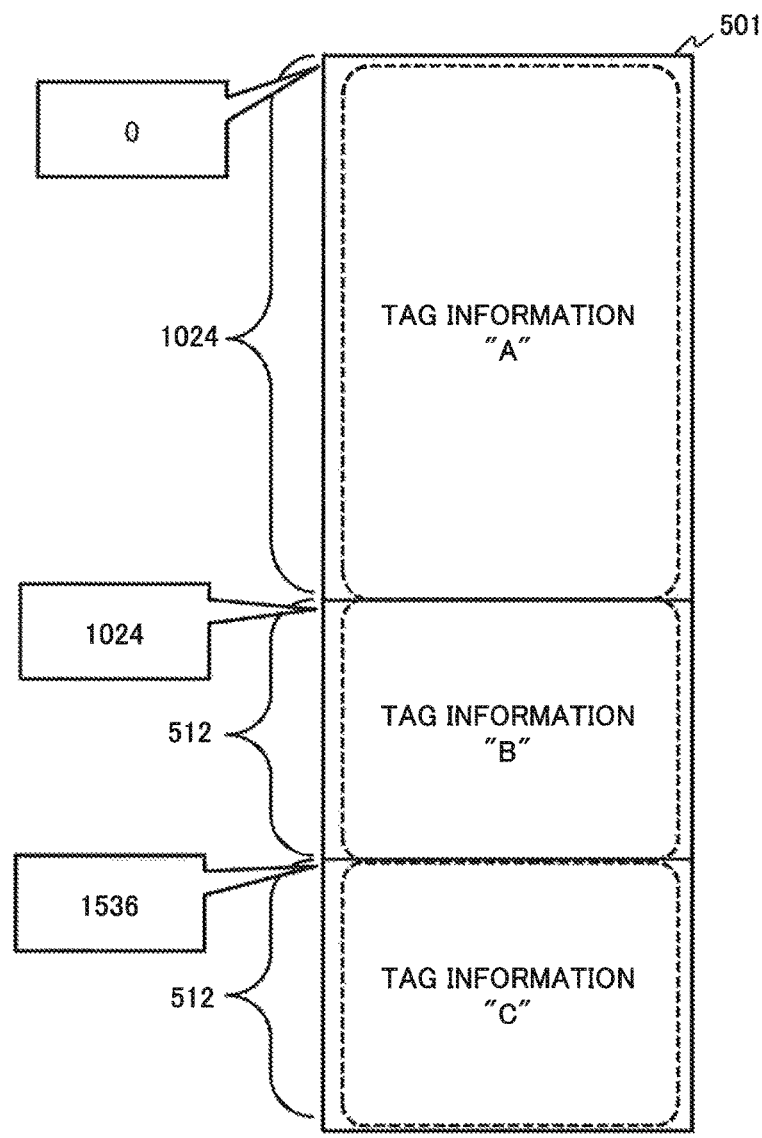
FIG. 5 is a diagram illustrating a specific example of collection target data assigned with tag information, according to the first example embodiment of the present invention.

For example, in the specific example illustrated in FIG. 5, tag information "A" is assigned to an area with an offset address starting from "0" and a size being "1024" in stored data. Similarly, tag information "B" is assigned to an area with an offset address starting from "1024" and a size being "512" in the stored data. Similarly, tag information "C" is assigned to an area with an offset address starting from "1536" and a size being "512" in the stored data. Particular units of the offset address and the size may be appropriately determined, and may be specified, for example, in terms of bytes or in terms of words.

When collection target data include state-holding data acquired from the processor 101, the data mapper 106 may assign specific tag information for indicating the state-holding data, to the state-holding data.

The data mapper 106 notifies the data writer 107 of collection target data to which tag information is assigned by referring to the mapping data 106a.

In the following, the data writer 107 according to the present example embodiment will be described. The data writer 107 according to the present example embodiment is communicably connected to the data mapper 106 and the record management unit 108 (to be described later).

The data writer 107 saves, as saved data, at least part of collection target data supplied by the data mapper 106, into the high-speed repository 109 (to be described later) in accordance with a collection policy 107a (to be described later). The data writer 107 according to the present example embodiment saves (accumulates) data saved in the high-speed repository 109 (to be described later), into the analysis storage 110 (to be described later) in accordance with the collection policy 107a. The data writer 107 accumulates data saved in the high-speed repository 109 (to be described later) into the analysis storage 110 (to be described later) in accordance with a request from the record management unit 108 (to be described later).

A specific configuration of the data writer 107 will be described below.

The data writer 107 according to the present example embodiment receives the collection target data to which tag information is assigned by the data mapper. In this case, the data writer 107 may acquire the collection target data from the data mapper 106, or data mapper 106 may supply the collection target data to the data writer 107.

The data writer 107 writes, as saved data, tag information assigned to a specific area in stored data included in collection target data, data in the specific area, and record timing information (to be described later) by associating them with one another, into the high-speed repository 109.

Figure 7:
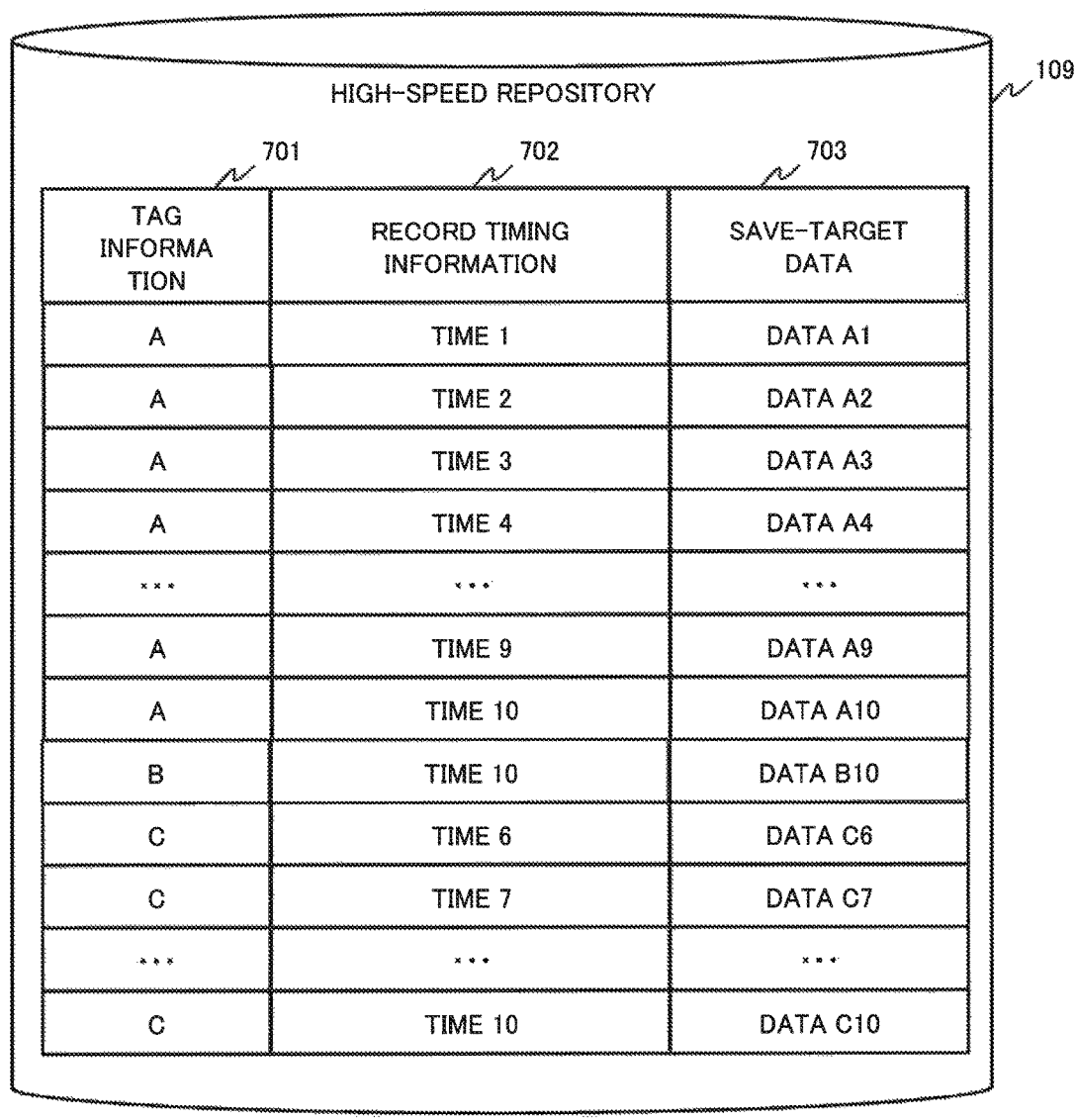
FIG. 7 is a diagram illustrating a specific example of saved data saved in a high-speed repository, according to the first example embodiment of the present invention.

In this case, the data writer 107 may save the saved data into the high-speed repository 109 with a data structure exemplified in FIG. 7. Tag information assigned to a specific area in stored data included in collection target data is set to tag information 701. Information indicating a timing or a time of recording of saved data is set to record timing information 702. Data in a specific area identified by tag information 701 in collection target data are set to save-target data 703.

For example, the collection timing information described above may be set to the record timing information 702. Information indicating a timing (time point) or a time at which the saved data are saved into the high-speed repository 109 (save timing information) may also be set to the record timing information 702. Additionally, information indicating a time other than the save timing information or the collection timing information being described above, may be set to the record timing information 702.

When collection target data include state-holding data, the data writer 107 may handle, as saved data, data associating tag information indicating the state-holding data with record timing information of the state-holding data, and a content of the state-holding data.

In the following, the collection policy 107a will be described with reference to FIG. 6. The collection policy 107a according to the present example embodiment includes a repository saving policy 601. The repository saving policy 601 is a first policy that defines a method of saving the collection target data into the high-speed repository 109.

Additionally, the collection policy 107a according to the present example embodiment includes a storage accumulation policy 602. The storage accumulation policy 602 is a second policy that defines a method of accumulating the saved data saved in the high-speed repository 109, into the analysis storage 110.

Tag information 601a assigned in the data mapper 106, repository-area specification information 601b, and repository-area saving information 601c, being associated with one another, are set to the repository saving policy 601.

The repository-area specification information 601b indicates information which specifies a storage area in the high-speed repository 109 in which the saved data are actually saved (may be hereinafter referred to as a "repository storage area").

The repository-area specification information 601b includes a starting address specifying a starting location of an area in which saved data are saved (stored), and a size of the area in which the saved data are saved (stored). Consequently, a storage area in the high-speed repository 109 in which saved data assigned with a specific tag is saved, can be specified. The repository-area specification information 601b may include the starting address and an ending address specifying an ending location of the area in which the saved data assigned with the specific tag are saved. Particular units of the starting (ending) address and the size in the repository-area specification information 601b may be appropriately determined. Such units may be specified, for example, in terms of bytes or in terms of words.

The repository-area saving information 601c includes information which can specify a method of saving a new piece of saved data into the repository storage area.

By referring to the repository saving policy 601, the data writer 107 obtains the repository-area specification information 601b associated with tag information assigned to collection target data. Specifically, the data writer 107 specifies an area for saving a specific area in stored data included in collection target data assigned with specific tag information as saved data in the high-speed repository 109 (repository storage area).

Then, by referring to the repository-area saving information 601c, the data writer 107 specifies a saving method for saving collection target data assigned with tag information into the high-speed repository 109. Then, the data writer 107 saves the collection target data assigned with the tag information into the specified repository storage area, in accordance with the saving method.

Figure 6:
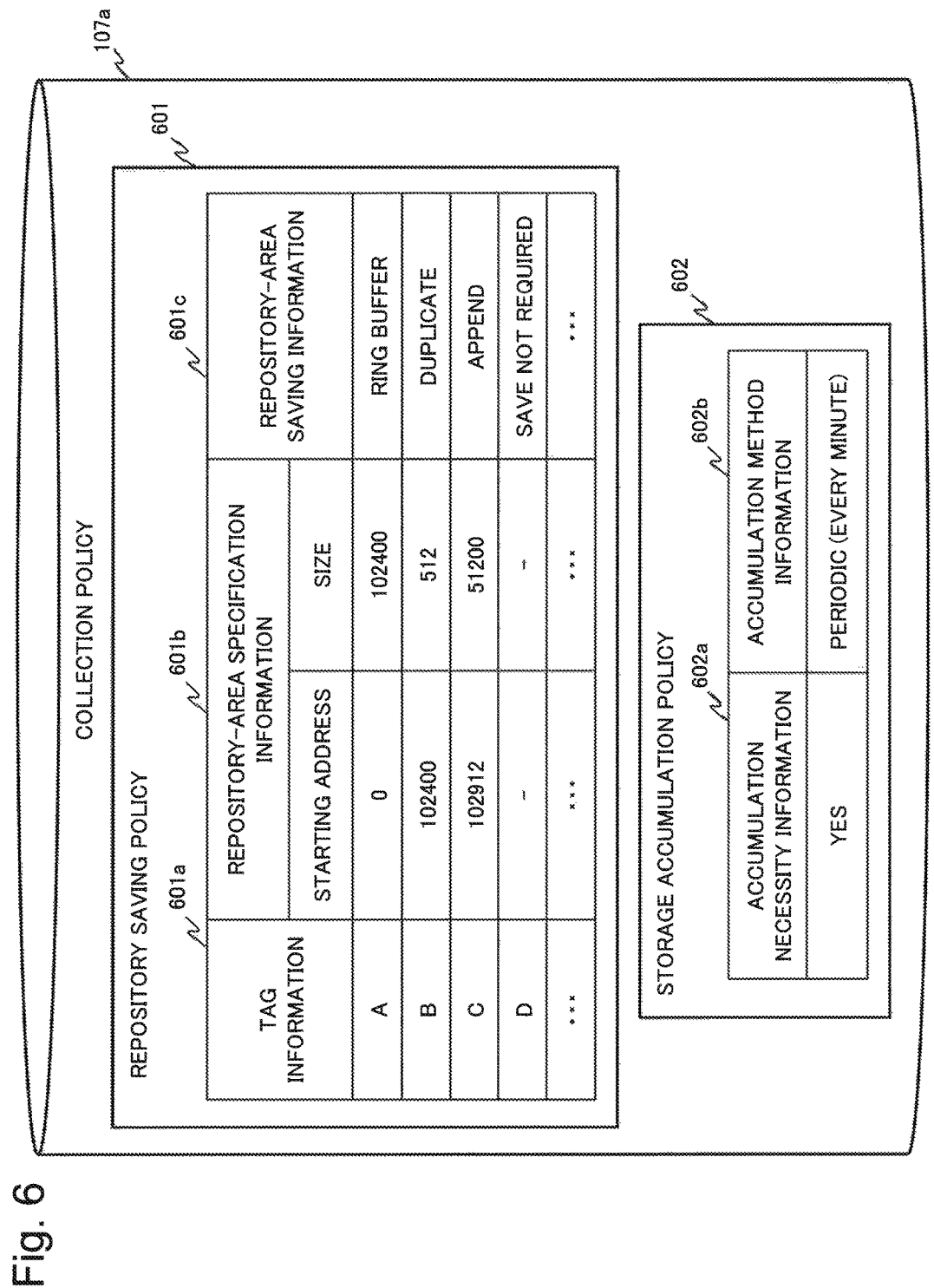
FIG. 6 is a diagram illustrating a specific example of a collection policy according to the first example embodiment of the present invention.

In the specific example illustrated in FIG. 6, for example, saving methods such as "Ring buffer," "Duplicate," "Append," and "Save not required" are specified in the repository-area saving information 601c. The saving methods represent information indicating a specific method for the data writer 107 to save, as saved data, collection target data assigned with tag information, into a repository storage area specified by the repository-area specification information 601b. More specifically, the data writer 107 is able to specify a specific area in which a new piece of saved data is saved in a repository storage area, by the saving methods. That is, the repository-area saving information 601c may be considered as information which can specify a repository storage area into which a new piece of saved data is saved. Each saving method will be specifically described later.

When repository-area saving information 601c is specified as "Save not required" with respect to particular tag information 601a (such as tag information "D" in FIG. 6), an area of collection target data assigned with the tag information is not saved in the high-speed repository. In other words, the data writer 107 is able to determine whether or not to save collection target data into the high-speed repository as saved data, in accordance with the repository-area saving information 601c. Thus, the repository-area saving information 601c may be considered as information which can determine whether to save collection target data into the high-speed repository as saved data. The repository-area saving information 601c according to the present example embodiment may employ any other saving method, without being limited to the specific example illustrated in FIG. 6.

Further, when saving saved data into the high-speed repository 109, the data writer 107 according to the present example embodiment may compress the saved data by any compression method. In this case, a capacity of data saved (stored) in the high-speed repository can be reduced, and therefore the data writer 107 is able to save a larger amount of saved data into the high-speed repository.

The storage accumulation policy 602 includes accumulation necessity information 602a indicating whether to save (accumulate) saved data in the high-speed repository 109 into the analysis storage 110. Additionally, the storage accumulation policy 602 includes accumulation method information 602b indicating a method for accumulating saved data in the high-speed repository into the analysis storage 110. The data writer 107 specifies a trigger for accumulating saved data in the high-speed repository into the analysis storage 110, in accordance with such accumulation method information 602*b*. Processing of accumulating saved data in the high-speed repository 109 into the analysis storage 110 may be hereinafter simply referred to as "backup of the high-speed repository 109."

For example, as exemplified in FIG. 6, when the accumulation necessity information 602*a* is "Yes" and the accumulation method information 602*b* is "Periodic (every minute)," the data writer 107 backs up the high-speed repository 109 every minute, in accordance with the storage accumulation policy 602.

The storage accumulation policy 602 according to the present example embodiment may employ any accumulation method, without being limited to the specific example illustrated in FIG. 6. For example, the data writer 107 may refer to the tag information 601*a* in the repository saving policy 601, and change an accumulation method for each specific type of tag information.

When backup of the high-speed repository 109 is not required, the accumulation necessity information 602*a* in the storage accumulation policy 602 may be set to "No," or the storage accumulation policy 602 may be deleted from the collection policy 107*a*.

For example, the data writer 107 according to the present example embodiment, configured as above is able to automatically back up the high-speed repository 109, in accordance with the collection policy 107*a*, without a request from the record management unit 108 (to be described later). In other words, for example, the data writer 107 is able to save saved data into the analysis storage 110, before receiving notification of a backup request from the record management unit 108 (to be described later). Such a backup request ("accumulation request") is a request notified by the record management unit 108, being accompanied by occurrence of an incident. Consequently, the analysis device 104 is able to analyze a state of the analysis target device 100 retroactively to a time before the occurrence of the incident.

Further, the data writer 107 according to the present example embodiment may back up the high-speed repository 109, in accordance with a request from the record management unit 108 (to be described later). Consequently, the data writer 107 according to the present example embodiment is able to accumulate saved data in the high-speed repository 109 into the analysis storage, in accordance with an instruction from a user, an administrator, or the like (unillustrated).

Further, the data writer 107 according to the present example embodiment may assign label information to saved data holding an operating state of the analysis target device 100 at a specific timing, in accordance with a request from the record management unit 108 (to be described later).

In this case, the data writer 107 obtains information indicating the specific timing (such as time information) and label information from snapshot information (to be described later) received from the record management unit 108. Then, the data writer 107 obtains saved data corresponding to the specific timing from the high-speed repository 109 or the analysis storage 110, and assigns label information to the extracted saved data. For example, when information indicating the specific timing specifies particular time, the data writer 107 may refer to the record timing information 702 in saved data, and assign label information to saved data acquired at a time closest to the specific timing. The assignment method of label information to each piece of saved data may be appropriately determined.

In the following, the record management unit 108 according to the present example embodiment will be described.

The record management unit 108 accepts a request about backup of the high-speed repository 109 into the analysis storage 110 from a user, an administrator, or the like (unillustrated). In this case, in accordance with the request, the record management unit 108 notifies a request about backup of the high-speed repository 109 (accumulation request) into the data writer 107.

The record management unit 108 accepts a request about backup the high-speed repository 109 to the analysis storage 110 from the sensor 111. The record management unit 108 accepts such a request and notifies, in accordance with the accepted request, an accumulation request to the data writer 107.

The record management unit 108 accepts a request about setting of a new collection policy 107*a* and change of the collection policy 107*a*, from a user, an administrator, or the like (unillustrated). In this case, the record management unit 108 accepts such a request and sets the repository saving policy 601 and the storage accumulation policy 602, being included in the collection policy 107*a*, in accordance with the accepted request. In this case, the record management unit 108 may directly change the collection policy 107*a*, or may request change of the collection policy 107*a* to the data writer 107.

The record management unit 108 accepts a request about change of the mapping data 106*a* from a user, an administrator, or the like (unillustrated). The record management unit 108 accepts such a request and changes the mapping data 106*a*, in accordance with the accepted request. In this case, the record management unit 108 may directly change the mapping data 106*a*, or may request change of the mapping data 106*a* to the data mapper 106.

The record management unit 108 accepts a request about setting of a sampling interval with respect to the dispatcher 105 from a user, an administrator, or the like (unillustrated). In this case, the record management unit 108 accepts such a request and notifies the change of the sampling interval to the dispatcher 105, in accordance with the accepted request.

The record management unit 108 may accept a request regarding generation of the collection target data from a user, an administrator, or the like (unillustrated). In this case, the record management unit 108 accepts such a request and requests generation of the collection target data to the dispatcher 105, in accordance with the accepted request.

The record management unit 108 may accept a request regarding generation of the collection target data, being accompanied by occurrence of an incident, from the sensor 111 (to be described later). In this case, the record management unit 108 accepts such a request and requests generation of the collection target data to the dispatcher 105, in accordance with the accepted request.

The record management unit 108 and the data writer 107, being configured as described above, are able to record only a particular memory space, and change a saving method for each memory space, by setting the collection policy 107*a*, in accordance with a request from a user or an administrator. In other words, the present example embodiment adjusts a size and a saving method of saved data to be saved in the high-speed repository 109, in accordance with the collection policy 107*a*. Consequently, the data writer 107 is able to economize on a storage capacity used in the high-speed repository 109 and accumulate a larger amount of saved data.

As described above, when the record management unit 108 is able to set a sampling interval with respect to the dispatcher 105, the record management unit 108 is able to adjust an amount of saved data saved into the high-speed repository 109 per unit of time.

As described above, when the sensor 111 detects occurrence of an incident, the record management unit 108 is able to handle requests regarding generation of collection target data and backup of the high-speed repository 109, being notified by the sensor 111. Consequently, the analysis device 104 is able to analyze an operation of the analysis target device 100 around a timing at which the incident occurs.

The record management unit 108 according to the present example embodiment may accept a request for saving an operating state of the analysis target device 100 at a particular timing as a snapshot, from a user or the like (unillustrated). In this case, the record management unit 108 transmits snapshot information including label information representing a snapshot, and information indicating the particular timing (such as time information), to the data writer 107. Such label information may be provided by a user or the like (unillustrated), or may be generated by the record management unit 108.

In the following, the high-speed repository 109 according to the present example embodiment will be described. The high-speed repository 109 is a storage area with a certain storage capacity, being capable of executing high-speed input and output (TO). A storage device, such as an SSD and a RAM disk, which are capable of executing high-speed data input and output, and having a relatively small storage capacity, may be employed as the high-speed repository 109.

The high-speed repository 109 according to the present example embodiment is communicably connected to the data writer 107, and saves saved data accepted from the data writer 107 into a storage area in the device itself. At this time, an area into which actual saved data are written in the high-speed repository 109 is set by the collection policy 107a (the repository saving policy 601 in particular), as described above.

Since a storage capacity of the high-speed repository 109 according to the present example embodiment is limited, the high-speed repository 109 may not be able to accumulate all saved data accepted from the data writer 107 on a long-term. Accordingly, data to be saved into the high-speed repository 109 and a saving method thereof are selected, in accordance with the collection policy 107a (the repository saving policy 601 in particular). Consequently, the analysis device 104 according to the present example embodiment is able to save as much saved data as possible into the high-speed repository 109.

In the following, the analysis storage 110 according to the present example embodiment will be described. The analysis storage 110 is a non-volatile storage device with a slower input and output processing speed but a larger storage capacity than the high-speed repository 109. Further, the analysis storage 110 is a storage device capable of storing stored data in the own device over a long period of time. For example, a magnetic disk device, or a storage device with a RAID configuration using a plurality of magnetic disk devices may be employed as such an analysis storage 110.

The analysis storage 110 according to the present example embodiment is communicably connected to the data writer 107 described above, and writes data for accumulation (saved data) accepted from the data writer 107 into a specific storage area in the own device.

The analysis storage 110 and the high-speed repository 109 may be directly connected through any communication line (such as a communication bus). In this case, the high-speed repository 109 may directly transfer saved data to the analysis storage 110, in accordance with a request from the data writer 107, and then the analysis storage 110 may accumulate the data.

The data writer 107 according to the present example embodiment accumulates saved data saved in the high-speed repository 109 into the analysis storage 110, in accordance with the collection policy 107a (the storage accumulation policy 602 in particular). Consequently, the analysis device 104 according to the present example embodiment is able to accumulate collection target data generated by the dispatcher 105, over a long period of time, by use of the analysis storage 110.

In the following, the sensor 111 will be described. The sensor 111 is any apparatus capable of detecting an incident potentially affecting operational processing in the analysis target device 100. The sensor 111 may include, for example, a known intrusion detection system (IDS) and an intrusion prevention system (IPS). Further, the sensor 111 may include, for example, a detector for detecting information by which an operation state of the analysis target device 100 can be presumed. More specifically, the sensor 111 may include, for example, a detector for measuring temperature of the analysis target device 100, and a operation rate of the processor 101.

The sensor 111 is communicably connected to the record management unit 108. For example, when detecting an incident, the sensor 111 may request the record management unit 108 to accumulate data saved in the high-speed repository 109 into the analysis storage 110. Further, the sensor 111 may request the record management unit 108 to generate collection target data in the dispatcher 105.

By such coordination between the analysis device 104 and the sensor 111, the analysis device 104 is able to accumulate data saved in the high-speed repository 109 into the analysis storage 110 when an incident occurs. Consequently, the analysis device 104 is able to accumulate data that can be used for analyzing an operation of the analysis target device 100 around an incident occurrence time, into the analysis storage 110.

In the following, the monitoring device 112 according to the present example embodiment will be described. The monitoring device 112 is an interface device provided for a user, an administrator, and the like (unillustrated), and is communicably connected to the analysis device 104 (the record management unit 108 in particular). The user, the administrator, or the like (unillustrated) notifies various types of requests to the analysis device 104 through the monitoring device 112. Whether or not to provide the monitoring device 112 may be selected suitably.

In the following, an operation of the analysis device 104 according to the present example embodiment, being configured as described above, will be described.

Figure 8:
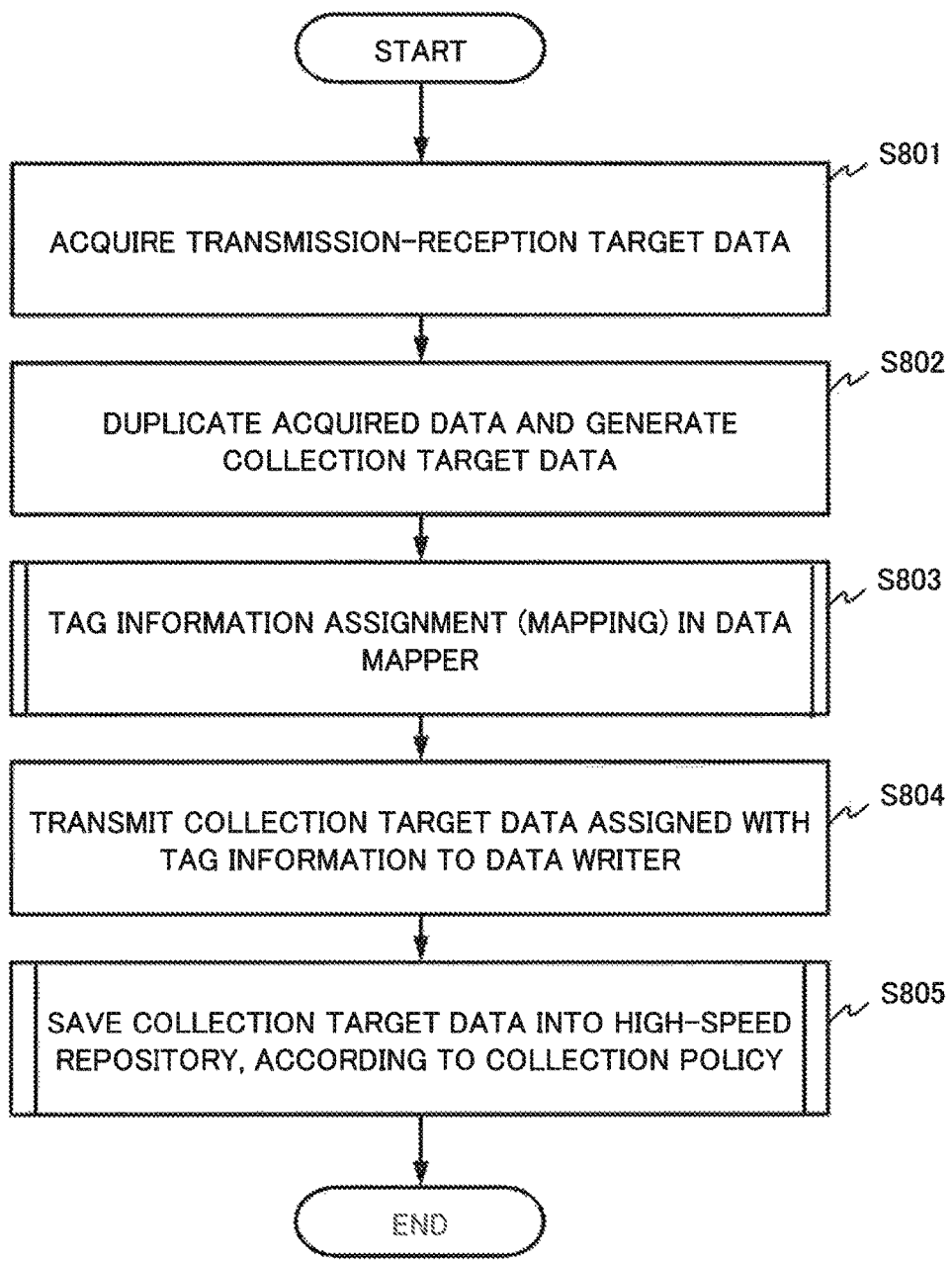
FIG. 8 is a flowchart exemplifying processing of the analysis device according to the first example embodiment of the present invention, for saving data by which an operating state of analysis target device can be reproduced, into a high-speed repository.

FIG. 8 is a flowchart exemplifying a sequence of processing from acquisition of data by the dispatcher 105 to saving data into the high-speed repository by the data writer 107. Processing exemplified in such a flowchart may be started, for example, in accordance with a request from the record management unit 108, or automatically started when the analysis device 104 is activated.

First, the dispatcher 105 acquires transmission-reception target data (Step S801).

Next, the dispatcher 105 duplicates data acquired in Step S801, and generates collection target data described above (Step S802). In this case, for example, the dispatcher 105 may generate collection target data by following processing. That is, by acquiring (capturing) all data transmitted and received between the processor 101 and the memory unit 102 on a time-series basis from a specific start point, the dispatcher 105 constructs stored data stored in the memory unit 102 at a specific time point. Then, the dispatcher 105 generates the collection target data including the constructed stored data. Alternatively, by acquiring a duplicate of stored data (a duplicate of memory dump) stored in the memory unit 102 at a specific time point, the dispatcher 105 may generate the collection target data including such stored data.

Then, the dispatcher 105 may transmit the collection target data generated as described above to the data mapper 106.

Next, the data mapper 106 assigns tag information to collection target data generated by the dispatcher 105 in Step S802, by referring to the mapping data 106a (Step S803). Specifically, the data mapper 106 assigns tag information for each specific area included in the collection target data, in accordance with memory-area specification information 301 and tag information 302 set in the mapping data 106a.

Next, the data mapper 106 sends (transmits) collection target data to which a tag is assigned in Step S803, to the data writer 107 (Step S804). In this case, the data writer 107 may acquire such collection target data from the data mapper 106.

The data writer 107 receives collection target data and saves the collection target data, as saved data, into the high-speed repository 109, in accordance with the collection policy 107a (Step S805).

Figure 9:
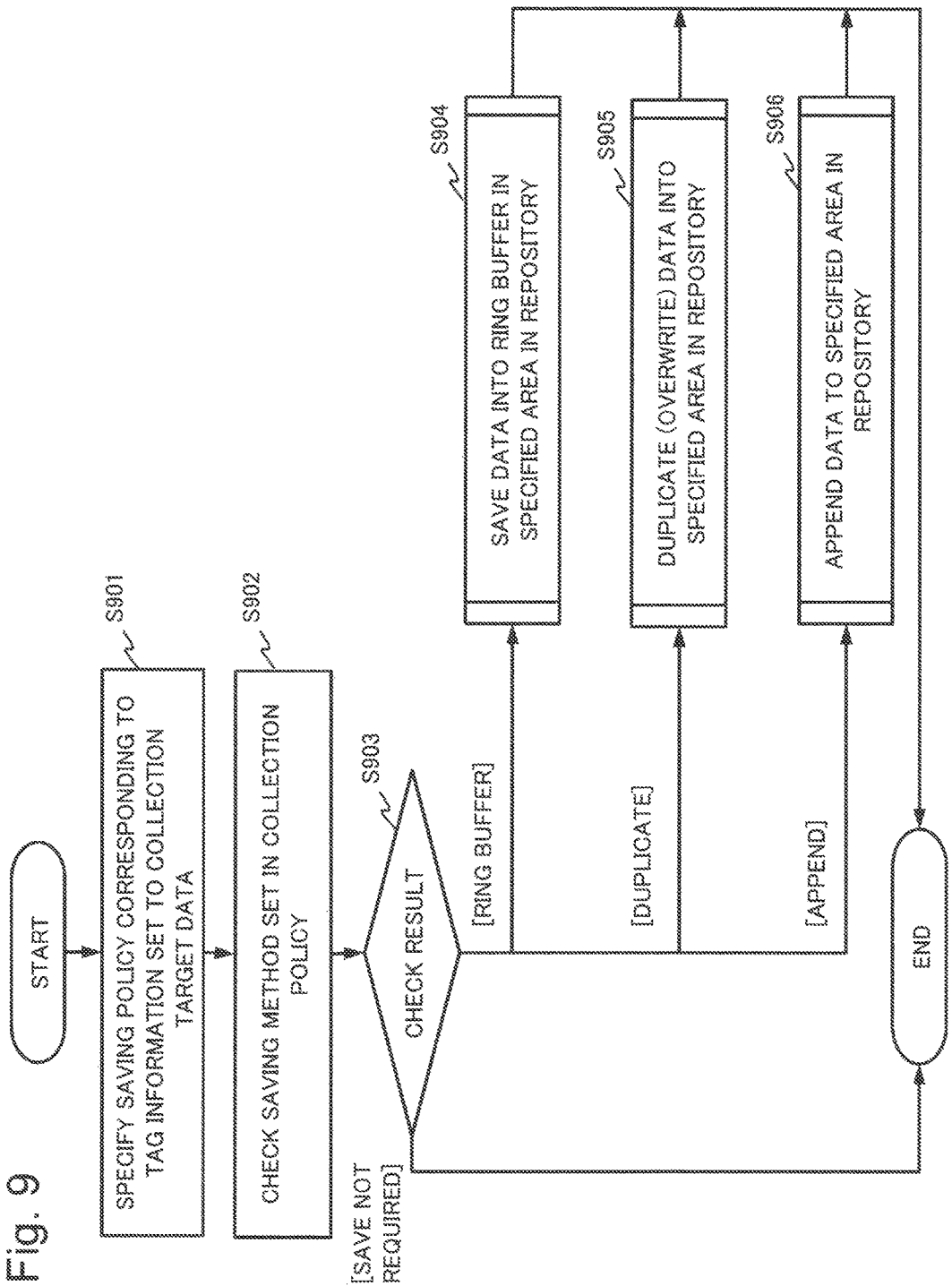
FIG. 9 is a flowchart exemplifying processing of the analysis device according to the first example embodiment of the present invention, for saving data by which an operating state of an analysis target device can be reproduced, into a high-speed repository.

The content of the processing in Step S805 will be described below with reference to a flowchart exemplified in FIG. 9.

First, the data writer 107 checks tag information set to each area in collection target data, and specifies a policy (repository saving policy 601) corresponding to the tag information in the collection policy 107a (Step S901). For example, with respect to an area included in collection target data to which "A" is set as tag information, the data writer 107 specifies repository-area specification information 601b (a size "102400" from a starting address "0" in this case) corresponding to the tag information "A," in accordance with the repository saving policy 601. Further, the data writer 107 specifies repository-area saving information 601c ("ring buffer" in this case) corresponding to the tag information "A," in accordance with the repository saving policy 601.

Next, the data writer 107 checks a saving method set in the collection policy 107a (Step S902). More specifically, the data writer 107 checks the specified repository-area saving information 601c.

When the saving method is "Save not required" as a result of the check in Step S902 (corresponding to "Save not required" in Step S903), the data writer 107 ends the processing.

When the saving method is "Ring buffer" as a result of the check in Step S902 (corresponding to "Ring buffer" in Step S903), the data writer 107 saves the saved data into a ring buffer (Step S904). Such a ring buffer is implemented in a storage area in the high-speed repository 109 specified by the repository-area specification information 601b.

More specifically, for example, the data writer 107 checks whether or not a free buffer (free block) exists in the ring buffer implemented in an area specified by the repository-area specification information 601b. When the free buffer does not exist, the data writer 107 deletes the oldest piece of data out of saved data saved in the area in the high-speed repository 109, and writes a new piece of saved data into the buffer. In other words, the data writer 107 updates the oldest piece of saved data with the new piece of saved data. In this case, the data writer 107 is able to detect the oldest piece of data saved in a specific area in the high-speed repository 109, by referring to the record timing information 702.

When the saving method is "Duplicate" as a result of the check in Step S902 (corresponding to "Duplicate" in Step S903), the data writer 107 overwrites a storage area in the high-speed repository 109 specified by the repository-area specification information 601b with the saved data (Step S905). In other words, when the saving method is "Duplicate," the data writer 107 may always overwrite the area specified by the repository-area specification information 601b with a new piece of saved data.

When the saving method is "Append" as a result of the check in Step S902 (corresponding to "Append" in Step S903), the data writer 107 appends a new piece of saved data to a storage area in the high-speed repository 109 specified by the repository-area specification information 601b (Step S906). When a free space is no longer available in the storage area, the data writer 107 may accumulate saved data saved in the storage area into the analysis storage 110, and initialize the storage area.

The saving methods described above are merely exemplifications. As another saving method, for example, the data writer 107 may write a new piece of saved data until a free space is no longer available in a storage area in the high-speed repository 109 specified by the repository-area specification information 601b, and stop writing when the free space is no longer available. Further, the data writer 107 may save saved data corresponding to a specific period into a storage area in the high-speed repository 109 specified by the repository-area specification information 601b, and discard the saved data when the period elapses. Any saving method other than the above may be set to the repository-area saving information 601c according to the present example embodiment.

In Steps S904 to S906, the data writer 107 writes, as saved data, tag information assigned to a specific area in collection target data, record timing information of the collection target data, and data included in the specific area in the collection target data, by associating these pieces of information with one another, into the high-speed repository 109.

Figure 10:
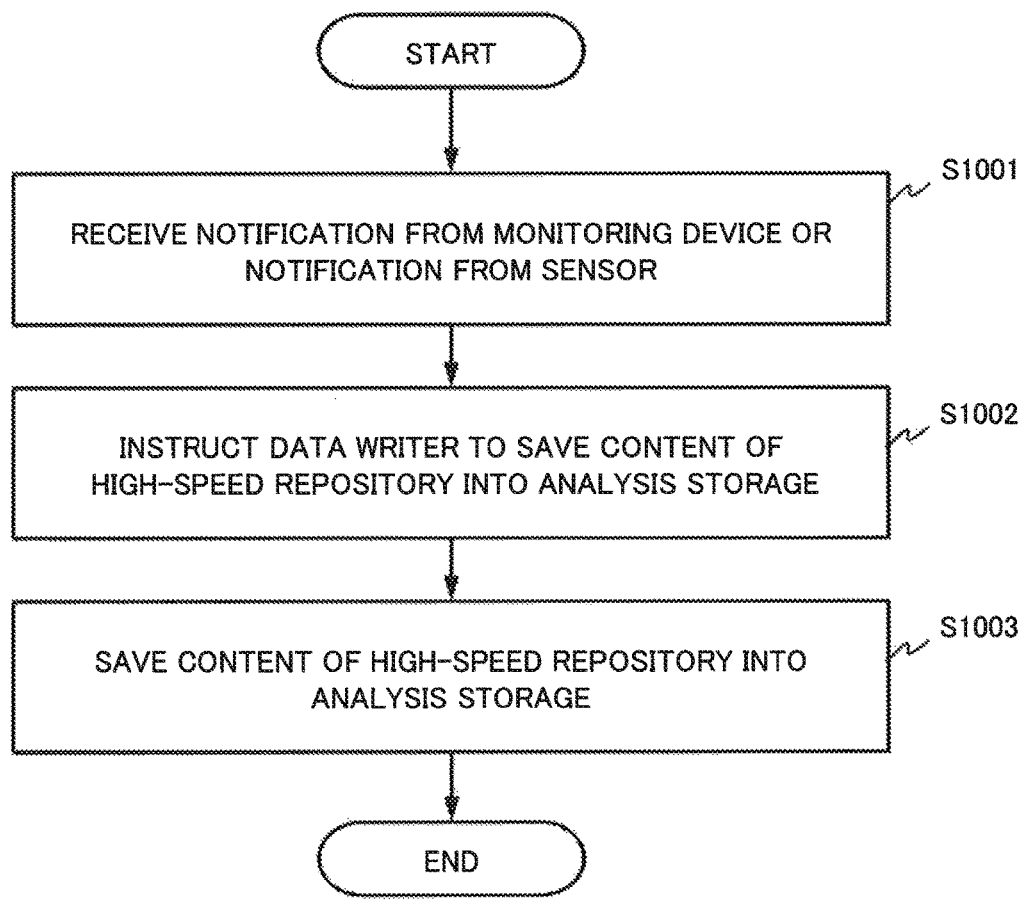
FIG. 10 is a flowchart exemplifying processing of the analysis device according to the first example embodiment of the present invention, for accumulating data saved in a high-speed repository into an accumulation device, in accordance with an external request.

In the following, processing in a case where the record management unit 108 requests backup of the high-speed repository 109 to the data writer 107 will be described with reference to a flowchart exemplified in FIG. 10.

First, the record management unit 108 receives a notification of request for backup of the high-speed repository 109, from the monitoring device 112 or the sensor 111 (Step S1001).

The record management unit 108 notifies a request for backup (accumulation request) of the high-speed repository 109 to the data writer 107, in accordance with the notification accepted in Step S1001 (Step S1002).

The data writer 107 receives the notification in Step S1002 and backs up saved data saved in the high-speed repository 109 to the analysis storage 110 (Step S1003).

Figure 11:
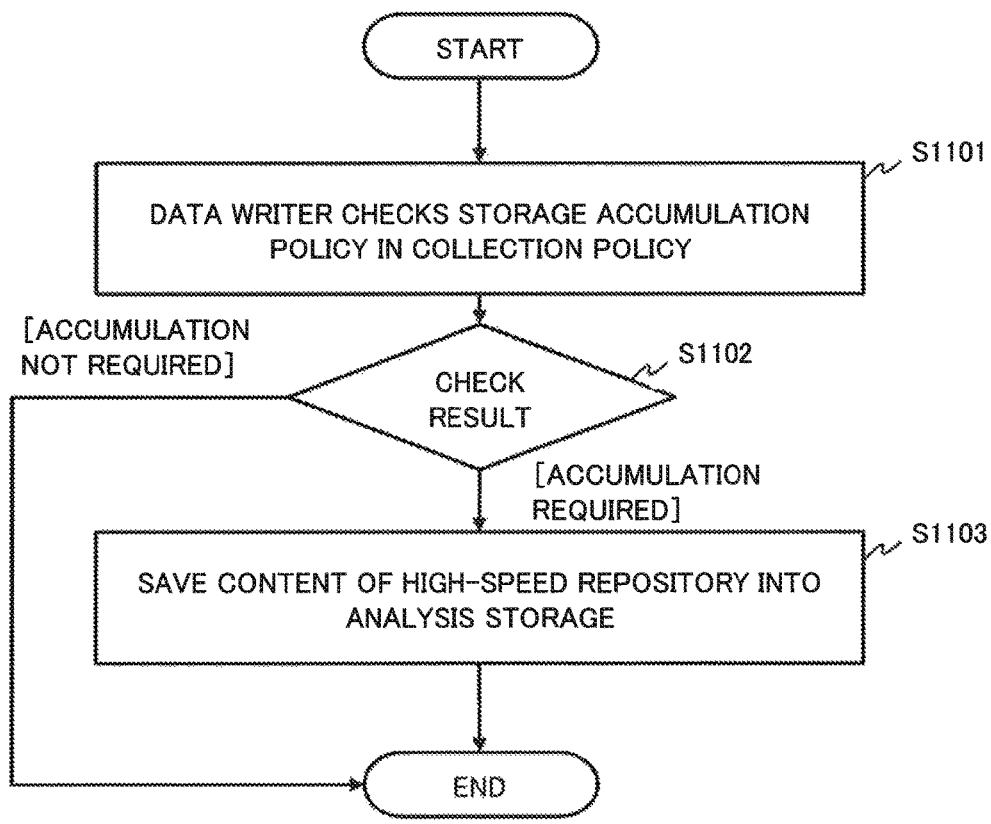
FIG. 11 is a flowchart exemplifying processing of the analysis device according to the first example embodiment of the present invention, for accumulating data saved in a high-speed repository into an accumulation device, in accordance with a collection policy.

In the following, processing of the data writer 107 about backup of the high-speed repository 109 into the analysis storage 110, in accordance with the storage accumulation policy 602, will be described with reference to a flowchart exemplified in FIG. 11.

First, the data writer 107 checks the storage accumulation policy 602 in the collection policy 107a (Step S1101).

When the storage accumulation policy 602 does not exist as a result of the check in Step S1101, the data writer 107 determines that it is not required to back up (accumulate) the high-speed repository 109 to the analysis storage 110 ("Accumulation not required" in Step S1102), and ends the processing. Similarly, when backup is set to be not required (the accumulation necessity information 602a is set to "No") in the storage accumulation policy 602 ("Accumulation not required" in Step S1102), the data writer 107 ends the processing.

In a case of "Accumulation required" in Step S1102 (the accumulation necessity information 602a is set to "Yes"), the data writer 107 refers to the accumulation method information 602b. Then, the data writer 107 backs up the saved data saved in the high-speed repository 109 to the analysis storage 110, in accordance with the accumulation method information 602b (Step S1103).

In the analysis device 104 according to the present example embodiment configured as described above, the dispatcher 105 generates collection target data, in accordance with transmission-reception target data that are transmitted and received between the processor 101 and the memory unit 102. Then, the data mapper 106 assigns tag information to such collection target data, in accordance with the mapping data 106a. Then, the data writer 107 saves the collection target data into the high-speed repository 109, in accordance with the collection policy 107a. Further, the data writer 107 backs up the high-speed repository 109 to the analysis storage 110, in accordance with the collection policy 107a.

Specifically, for example, the analysis device 104 is able to save only an area assigned with particular tag information into the high-speed repository 109. Further, for example, the analysis device 104 is able to save a large amount of saved data assigned with particular tag, and save a small amount of saved data assigned with another type of the tag. In this manner, the mapping data 106a and the collection policy 107a, according to the present example embodiment, may be considered to function as a filter defining whether to save data included in collection target data, in accordance with tag information.

That is, in accordance with tag information assigned to collection target data, the analysis device 104 according to the present example embodiment is able to change a saving method into the high-speed repository, for each area to which the tag information is assigned. Consequently, the analysis device 104 is able to use efficiently a storage area in the high-speed repository 109 with a certain storage capacity.

Further, the data writer 107 is able to save saved data in a into the high-speed repository 109 by compressing the saved data. Consequently, the analysis device 104 is able to save a larger amount of saved data with respect to a storage capacity of the high-speed repository.

Further, by setting a sampling interval in the dispatcher 105, an amount of collection target data to be acquired per unit of time can be adjusted. Consequently, the analysis device 104 is able to adjust a storage capacity of the high-speed repository consumed per unit of time.

Further, the dispatcher 105 is able generate collection target data, in accordance with a notification from the sensor 111 or the monitoring device 112. Similarly, the data writer 107 is able to back up the high-speed repository 109 to the analysis storage 110, in accordance with a notification from the sensor 111 or the monitoring device 112. Accordingly, for example, the analysis device 104 according to the present example embodiment is able to save an operating state of the analysis target device 100 before and after a time point of occurrence of a specific incident.

As described above, the analysis device 104 according to the present example embodiment is able to save a larger amount of data that can be used to reproduce a state of the analysis target device 100, by use of a storage device with a limited storage capacity.

First Modified Example of First Example Embodiment

Figure 12:
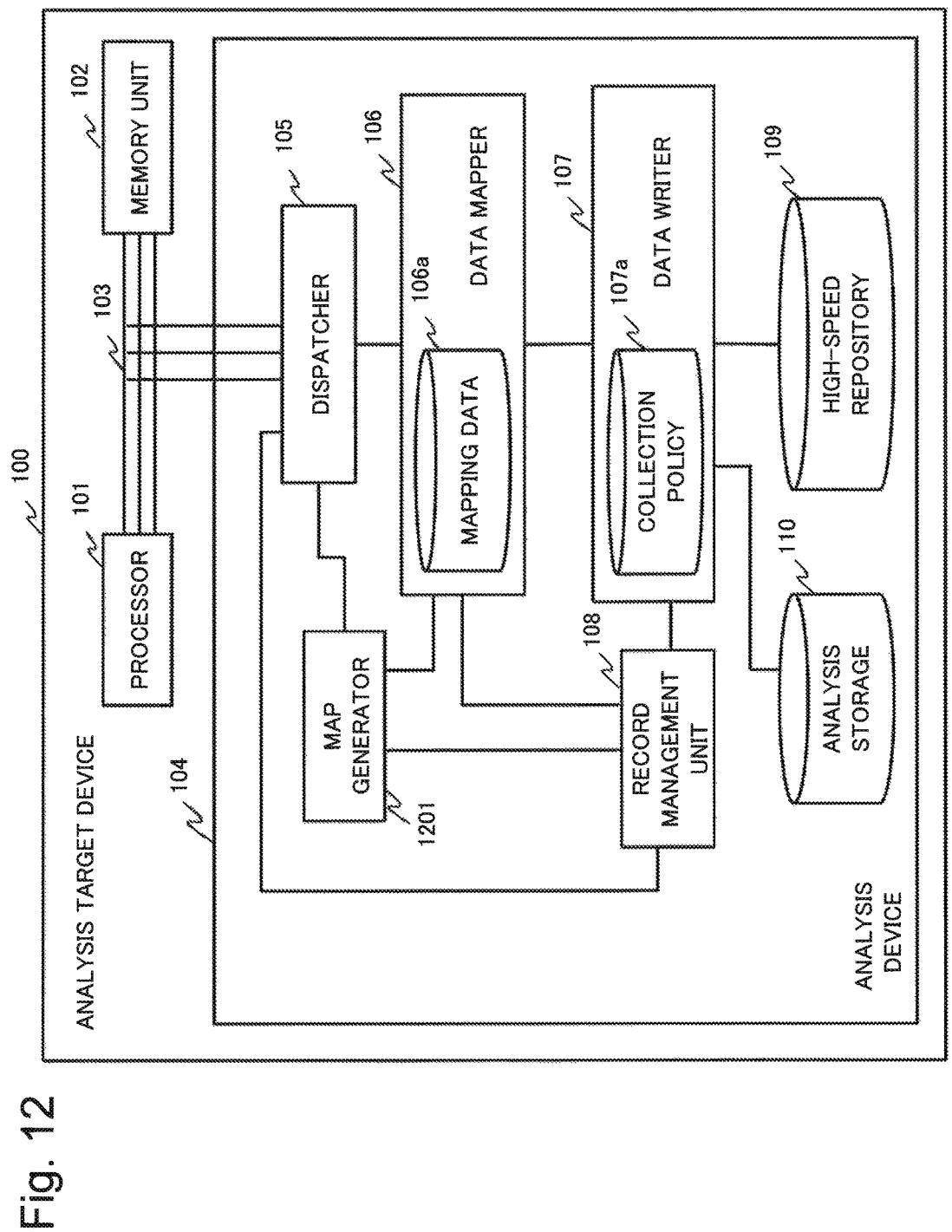
FIG. 12 is a block diagram exemplifying functional configurations of an analysis device and an analysis target device, according to a first modified example of the first example embodiment of the present invention.

In the following, a first modified example of the first example embodiment described above will be described. The present modified example differs from the analysis device 104 according to the first example embodiment in a point that a map generator 1201 is added, as exemplified in FIG. 12, and the remaining configuration is similar. Accordingly, such a difference will be described below, and description of the similar configuration is omitted.

The map generator 1201 according to the present modified example is communicably connected to the dispatcher 105 and the data mapper 106. Further, the map generator 1201 may be communicably connected to the record management unit 108.

The map generator 1201 generates suitable mapping data, in accordance with information regarding an architecture which represents a basic configuration of the analysis target device 100. Then, the map generator 1201 registers the generated mapping data in the mapping data 106a. The map generator 1201 may send the generated mapping data to the data mapper 106 and request update of the mapping data 106a.

More specifically, the map generator 1201 acquires information regarding an architecture representing a basic configuration of the processor 101 from, for example, the dispatcher 105. Further, the map generator 1201 may acquire information regarding an operating system (OS) executed in the analysis target device 100 through the record management unit 108. In this case, a user, an administrator, or the like (unillustrated) may notify the information regarding the OS to the map generator 1201 through the record management unit 108.

The map generator 1201 uses the acquired information regarding the architecture of the processor 101 and the acquired information regarding the OS executed in the analysis target device 100 as information regarding an architecture of the analysis target device 100. The map generator 1201 generates mapping data, in accordance with information regarding the architecture. Then, the map generator 1201 registers the generated mapping data in the mapping data 106a.

Specifically, for example, the map generator 1201 may divide the stored data into areas with regard to respective processes executed in the analysis target device 100, and generate mapping data that associates each area with a process name as tag information. By using the generated mapping data 106a and the corresponding collection policy 107a, the analysis device 104 is able to, for example, control data saved in the high-speed repository 109 as follows. That is, the analysis device 104 is able to perform control, so as to save a large number of memory areas (stored data) related to a particular process being highly important, and not to save a memory area related to a less important process, in the high-speed repository 109.

Further, by introducing the map generator 1201, for example, the analysis device 104 is also able to change dynamically the mapping data 106a, depending on processing status in the analysis target device 100.

By thus identifying a memory area of high importance and a memory area of low importance by use of tag information, the analysis device 104 according to the present modified example is able to change a saving method in the collection policy 107a for each type of tag information. Further, by introduction of the map generator 1201, the analysis device 104 is able to dynamically change tag information identifying a memory area of high importance and a memory area of low importance, depending on processing status in the analysis target device 100.

Therefore, the analysis device 104 according to the present example embodiment is able to save a larger amount of data by which a state of the analysis target device 100 can be reproduced, by use of a storage device with a limited storage capacity.

Second Modified Example of First Example Embodiment

In the following, a second modified example of the first example embodiment described above will be described. The present modified example differs from the first example embodiment in that a plurality of analysis target devices 100 exist. Consequently, according to the present modified example, as exemplified in FIG. 13, a plurality of dispatchers 105, data mappers 106, and map generators 1201 is included. Each of the plurality of components may be considered similar to the first example embodiment described above.

Figure 13:
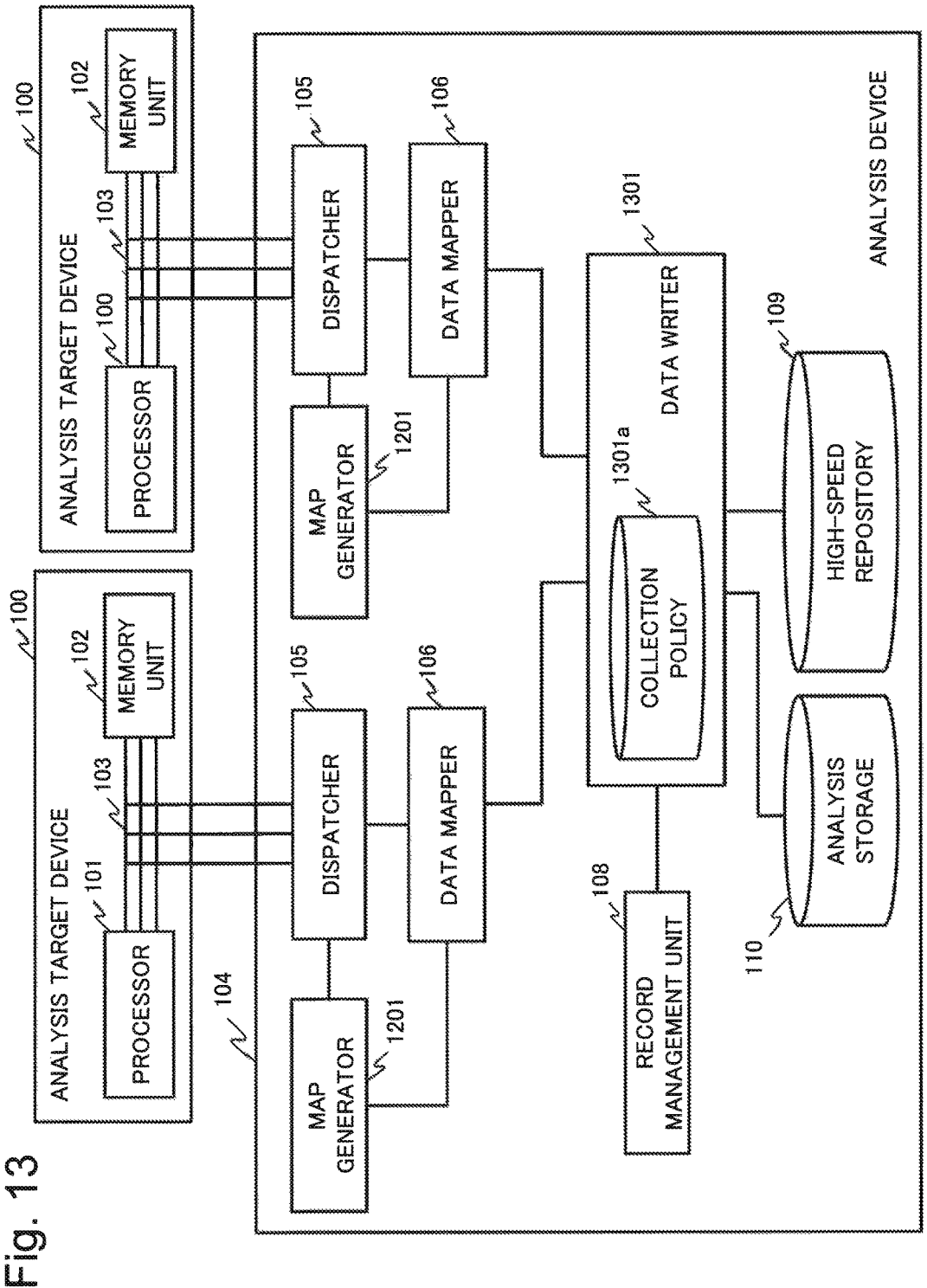
FIG. 13 is a block diagram exemplifying functional configurations of an analysis device and an analysis target device, according to a second modified example of the first example embodiment of the present invention.

A data writer 1301 exemplified in FIG. 13 differs from the data writer 107 according to the first example embodiment, in accepting collection target data from a plurality of data mappers 106, and the remaining configuration is similar. The data writer 1301 according to the present modified example saves respective pieces of collection target data accepted from a plurality of data mappers 106 into the high-speed repository 109 as saved data.

Figure 14:
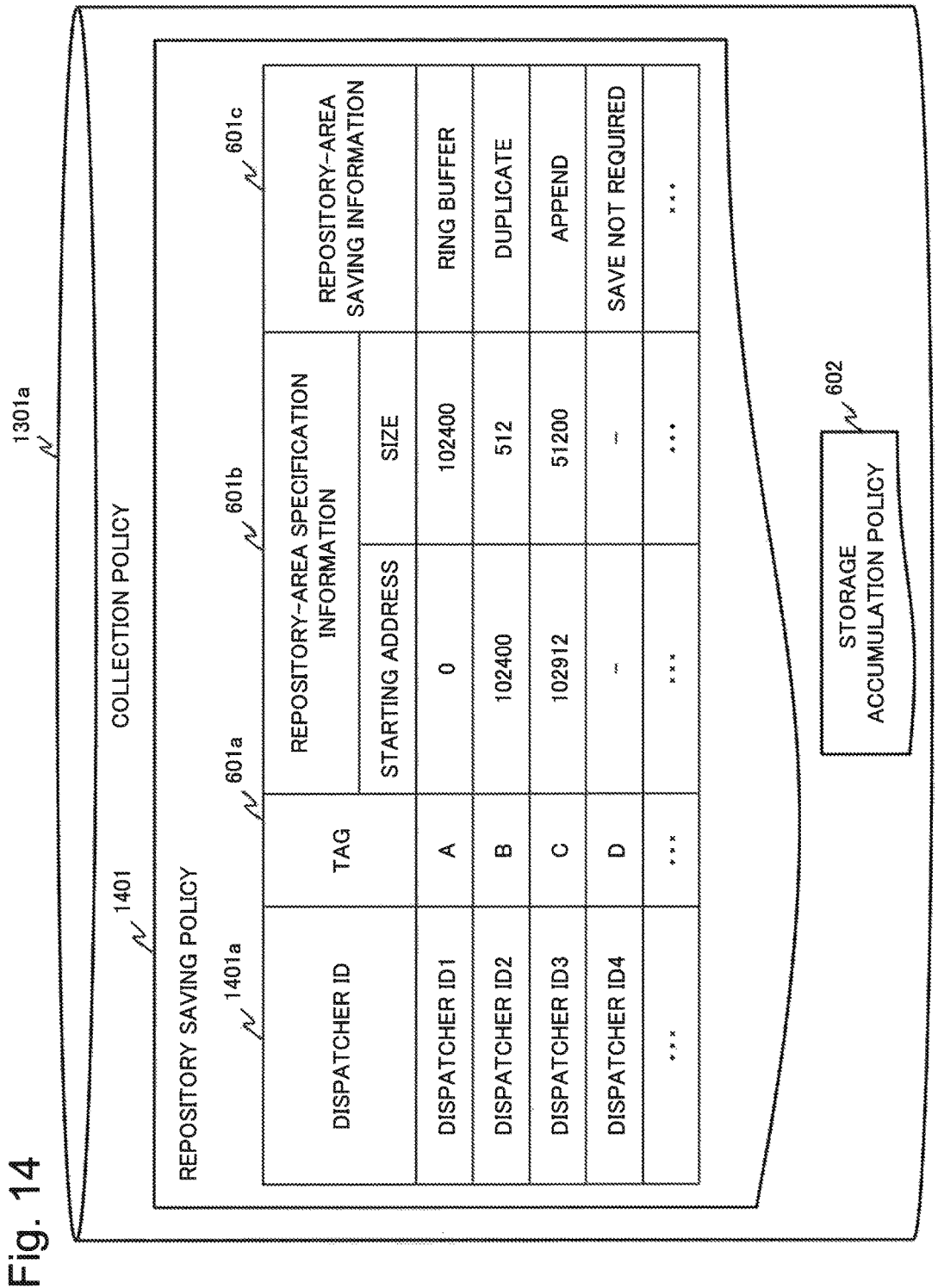
FIG. 14 is a diagram illustrating a specific example of a collection policy according to the second modified example of the first example embodiment of the present invention.

As exemplified in FIG. 14, a collection policy 1301a differs from the collection policy 107a according to the first example embodiment, in including a dispatcher identifier (ID) 1401a by which each of a plurality of dispatchers 105 can be identified. The remaining configuration of the collection policy 1301a is similar to the collection policy 107a.

The data writer 1301 saves, as saved data, collection target data accepted from each data mapper 106 into the high-speed repository 109, in accordance with the collection policy 1301a. In this case, the data writer 1301 is able to identify the data mapper 106 from which the collection target data are acquired (and the dispatcher 105 that generated the collection target data). Consequently, for each piece of collection target data, the data writer 1301 is able to apply a policy assigned with a dispatcher ID corresponding to the dispatcher 105 generating the collection target data.

The data writer 1301 may save saved data into the high-speed repository 109 by use of a format as exemplified in FIG. 15. That is, for each piece of saved data, the dispatcher 105 that generated the saved data (and analysis target device 100 that are related to the saved data) can be identified with a dispatcher ID 1501.

The remaining operation of the analysis device 104 according to the present modified example may be considered similar to the analysis device 104 according to the first example embodiment, and therefore detailed description is omitted.

The analysis device 104 according to the present modified example is able to collect data related to each of a plurality of analysis target devices 100 with a single analysis device 104, and is able to analyze the data. Therefore, the analysis device 104 according to the present modified example is able to provide a similar effect to the first example embodiment, and also analyze a large number of analysis target devices 100 with a small number of analysis devices 104.

While two analysis target devices 100 are exemplified in the configuration exemplified in FIG. 13, the present example embodiment is not limited thereto, and any number of analysis target devices 100 may be employed.

Second Example Embodiment

In the following, a second example embodiment based on the analysis device according to the aforementioned first example embodiment will be described.

In the following description, a part characteristic of the present example embodiment is mainly described, and overlapping description of the same configuration as in the aforementioned first example embodiment is omitted.

Figure 16:
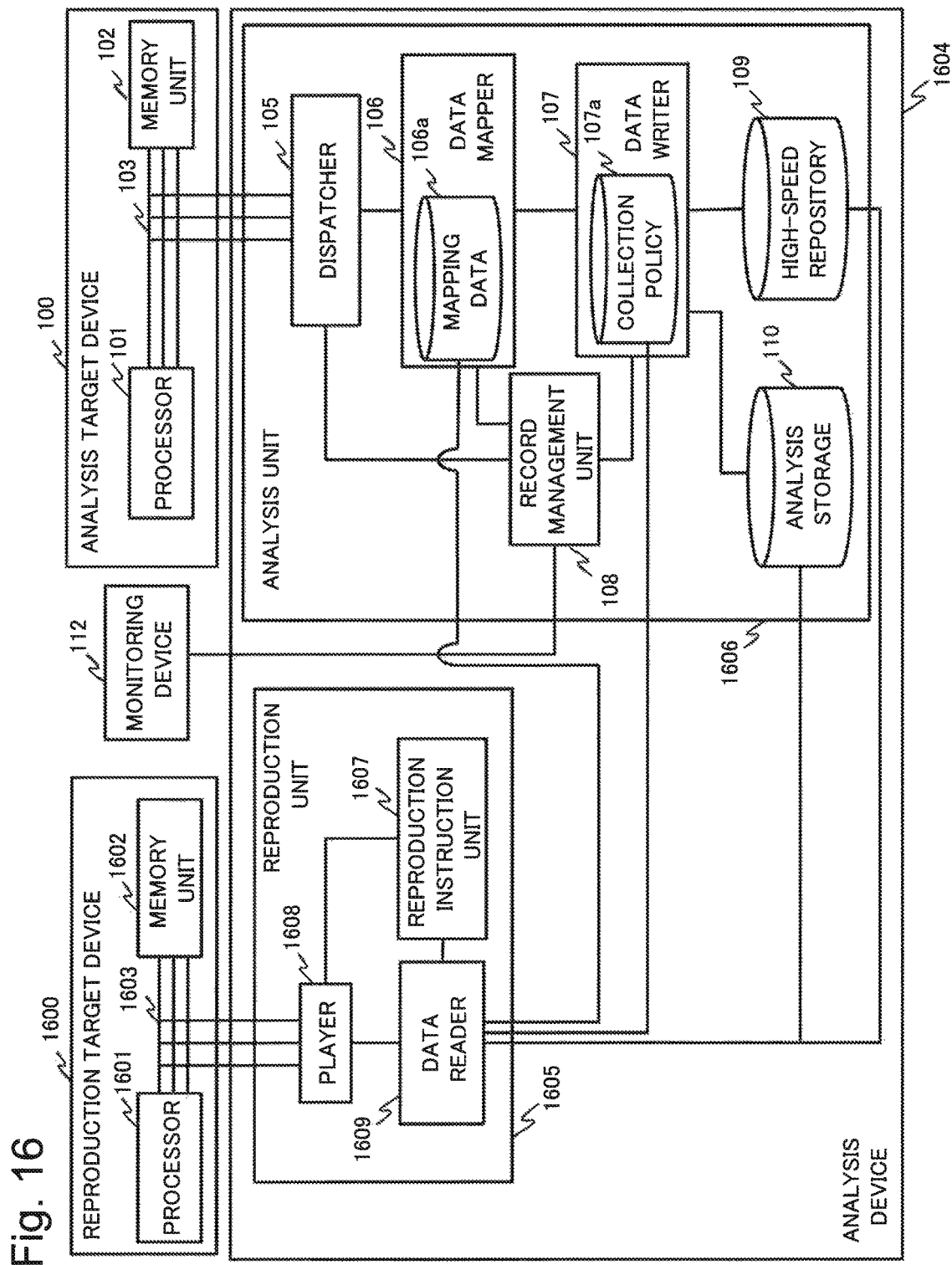
FIG. 16 is a block diagram exemplifying functional configurations of an analysis device and an analysis target device, according to a second example embodiment of the present invention.

An analysis device 1604 according to the present example embodiment exemplified in FIG. 16 differs from the analysis device 104 according to the first example embodiment in including a reproduction unit 1605. In the following description, the reproduction unit 1605 being a characteristic part of the present example embodiment will be mainly described. An analysis unit 1606 exemplified in FIG. 16 may be considered similar to a component in the analysis device 104 according to the first example embodiment, and therefore detailed description is omitted.

First, a reproduction target device 1600 according to the present example embodiment will be described. The reproduction target device 1600 includes a processor 1601 and a memory unit 1602 being communicably connected to the processor 1601 through a communication bus 1603. The processor 1601 and the memory unit 1602 may be respectively similar to the processor 101 and the memory unit 102, according to the first example embodiment, and therefore detailed description is omitted. While the analysis target device 100 and the reproduction target device 1600 are illustrated as separate devices in FIG. 16, the present example embodiment is not limited these configuration. The analysis target device 100 and the reproduction target device 1600 may be configured in the same device.

Next, the reproduction unit 1605 according to the present example embodiment will be described. The reproduction unit 1605 includes a data reader 1609, a player 1608, and a reproduction instruction unit 1607. Each component will be described below.

In the following, the reproduction instruction unit 1607 according to the present example embodiment will be described. The reproduction instruction unit 1607 is communicably connected to the data reader 1609 and the player 1608.

The reproduction instruction unit 1607 transmits a reproduction request that represents instruction for reproducing a specific operating state in the analysis target device 100 to the player 1608, in accordance with, for example, a request from a user, an administrator, or the like (unillustrated). In this case, for example, the reproduction instruction unit 1607 sets, to the reproduction request, reproduction-target specification information that can specify an operating state of the analysis target device 100, which is a reproduction target. Such reproduction-target specification information may be, for example, information indicating a timing (or a time) at which an operating state of the analysis target device 100 is to be reproduced, or label information corresponding to the snapshot described above. However, reproduction-target specification information is not limited thereto.

In the following, the player 1608 according to the present example embodiment will be described. The player 1608 according to the present example embodiment is communicably connected to the data reader 1609 and the reproduction instruction unit 1607. Further, the player 1608 is communicably connected to the processor 1601 and the memory unit 1602 in the reproduction target device 1600.

The player 1608 loads (sets) data saved in the high-speed repository 109 into the processor 1601 and the memory unit 1602, in accordance with, for example, a request (reproduction request) from the reproduction instruction unit 1607. Consequently, the player 1608 reproduces an operating state of the analysis target device 100 in the reproduction target device 1600.

Specifically, the player 1608 first extracts reproduction-target specification information included in a reproduction request received from the reproduction instruction unit 1607. Then, the player 1608 transmits the reproduction-target specification information to the data reader 1609, and requests reproduction of collection target data. For example, when time information is set to reproduction-target specification information, the player 1608 requests the data reader 1609 to reproduce collection target data at the time. Further, for example, when label information is set to reproduction-target specification information, the player 1608 requests data reader 1609 to reproduce collection target data, in accordance with saved data assigned with the label information. Reproduction processing of collection target data in the data reader 1609 will be described later.

The player 1608 receives collection target data reproduced in the data reader 1609 from the data reader 1609. Reproduced collection target data may be hereinafter referred to as "reproduction data."

Then, the player 1608 sets stored data, of the memory unit 102, included in the reproduction data to the memory unit 1602. When the stored data include information (such as an address) which can specify an area of the stored data stored in the memory unit 102, the player 1608 sets the stored data to the memory unit 1602, in accordance with such information.

Additionally, when the reproduced reproduction data include state-holding data of the processor 101, the player 1608 sets such state-holding data to the processor 1601.

As described in the first example embodiment, the data writer 107 may save part of collection target data collected in the dispatcher 105 into the high-speed repository 109 as saved data, in accordance with the collection policy 107a. In other words, in this case, only part of original transmission-reception target data acquired in the dispatcher 105 can be reproduced as reproduction data from such saved data.

In this case, an operation of the analysis target device 100 may not be completely reproduced only by the reproduction data. However, an operating state of the analysis target device at a specific timing can be analyzed, at least in accordance with data included in the reproduction data. Further, depending on a type and a content of the area omitted from the original collection target data, the operation of the analysis target device 100 may be reproducible in part or in whole when the reproduction data are loaded into the reproduction target device 1600.

Consequently, when only part of the original collection target data can be reproduced by the reproduction data, the player 1608 according to the present example embodiment may load collection target data reproduced in the data reader 1609 into the processor 1601 and the memory unit 1602.

A specific method for setting state-holding data to the processor 1601 may be appropriately selected according to a configuration of the processor 1601. For example, the player 1608 may set state-holding data through a specific input-output port of the processor 1601. Similarly, a specific method of setting stored data to the memory unit 1602 may be appropriately selected according to a configuration of the memory unit 1602. For example, the player 1608 may feed required data into the memory unit 1602, through the communication bus 1603. Further, when the processor 1601 and the memory unit 1602 are configured as virtual devices, the player 1608 may use a function provided in a virtualization infrastructure.

Further, the player 1608 may delay a processing speed by controlling the processor 1601. More specifically, the player 1608 lowers an operating frequency (operating clock) of the processor 1601, by, for example, sending a certain command to the processor 1601, or setting a specific value to a certain register in the processor 1601. When the processor 1601 is provided as a virtual processor, the player 1608 may change an operating frequency of the processor 1601 by use of a function provided in a virtualization infrastructure.

By loading collection target data at a lowered (reduced) processing speed of the processor 1601, it becomes easy to analyze an operation of the reproduction target device 1600 in a state in which the collection target data are loaded. Consequently, for example, it becomes easy to track a specific process executed in the reproduction target device 1600 by use of a debugger or the like, for analysis of an operation of the reproduction target device 1600.

The player 1608 according to the present example embodiment may successively request reproduction data to the data reader 1609, from a specific time point on a time-series data. The player 1608 may successively load acquired reproduction data into the processor 1601 and the memory unit 1602.

The player 1608 according to the present example embodiment may control the processor 1601 to perform processing after loading reproduction data to the processor 1601 and the memory unit 1602. In this case, an operating state of the reproduction target device 1600 can be analyzed while operating the reproduction target device 1600 from a state that the reproduction data are loaded.

In the following, the data reader 1609 according to the present example embodiment will be described. The data reader 1609 is communicably connected to the high-speed repository 109 and the analysis storage 110. The data reader 1609 is also communicably connected to the player 1608 and the reproduction instruction unit 1607. The data reader 1609 is configured so as to be able to refer to the collection policy 107a. In this case, the data reader 1609 is communicably connected to the data writer 107, and may refer to the collection policy 107a included in the data writer 107, or may receive (acquire) the collection policy 107a from the data writer 107.

Additionally, the data reader 1609 is configured so as to be able to refer to the mapping data 106a as needed. In this case, the data reader 1609 is communicably connected to the data mapper 106, and may refer to the mapping data 106a included in the data writer 107, or may receive (acquire) the mapping data 106a from the data writer 107.

The data reader 1609 restores saved data in the analysis storage 110 into the high-speed repository 109, in accordance with a request from the reproduction instruction unit 1607 or the player 1608. Further, the data reader 1609 reproduces collection target data described in the first example embodiment, in accordance with saved data restored in the high-speed repository. An operation of the data reader 1609 will be described below.

First, the data reader 1609 accepts a reproduction request of collection target data from the player 1608, and extracts saved data corresponding to the collection target data. Specifically, the data reader 1609 checks record timing information 702 assigned to saved data saved in the analysis storage 110, and extracts (reads) saved data at a time or after a time being closest to the particular time specified by the player 1608. When label information indicating a specific snapshot is specified by the player 1608, the data reader 1609 may extract saved data assigned with the label information. Then, the data reader 1609 writes (restores) the extracted saved data into the high-speed repository 109.

In this case, the data reader 1609 may successively read saved data of which a time set in the record timing information 702 is later than the time set to the extracted (restored) saved data, on a time-series basis, and successively restore the data into the high-speed repository 109.

The data reader 1609, for example, may refer to the collection policy 107a, and continue restoring saved data until a ratio of a free space in an area specified by the repository-area specification information 601b associated with each type of tag information 601a becomes less than or equal to a particular value.

By referring to the high-speed repository 109 in which saved data are restored, the data reader 1609 collects saved data to which specific time information (time information of a reproduction target specified by the player 1608) is set to the record timing information 702. The data reader 1609 generates reproduction data by use of the tag information 701 and the save-target data 703, constituting the collected saved data. In other words, the data reader 1609 generates reproduction data which can reproduce a state of operational processing of the analysis target device 100 at a specific time point.

Further, the data reader 1609 may collect saved data assigned with a specific label (label information of a reproduction target supplied by the player 1608), and generate reproduction data by use of the save-target data 703 in the collected saved data.

When generating reproduction data, the data reader 1609 may refer to the mapping data 106a as needed.

As a specific example, assuming that the saved data as exemplified in FIG. 7 are saved in the restored high-speed repository 109, and the data exemplified in FIG. 4 are set in the mapping data 106a. It is further assumed that the player 1608 transmits a reproduction request including reproduction-target specification information indicating a "time 10" to the data reader 1609.

First, the data reader 1609 selects saved data set with a "time 10" as record timing information. In this case, data of which the save-target data 703 is set to "Data A10," "Data B10," and "Data C10" are selected.

The data reader 1609 generates reproduction data by use of the tag information 701 and the save-target data 703 in each piece of saved data, in accordance with the mapping data 106a. In this case, by referring to the mapping data 106a, the data reader 1609 specifies tag information 302 corresponding to the tag information 701 being set to the extracted saved data. In this case, the tag information includes "A," "B," and "C."

Next, the data reader 1609 extracts memory-area specification information 301 associated with the specified tag information 302. Then, the data reader 1609 generates reproduction data so that the save-target data 703 are arranged in an area specified by the memory-area specification information 301. Specifically, the data reader 1609 sets "Data A10" in a range with a starting address "0" and a size "1024" in the reproduction data. The data reader 1609 sets "Data B10" in a range with a starting address "1024" and a size "512" in the reproduction data. The data reader 1609 sets "Data C10" in a range with a starting address "1536" and a size "512" in the reproduction data.

When an address in the memory unit 102 is included in stored data included in save-target data 703, reproduction data may be generated in accordance with such an address.

Figure 17:
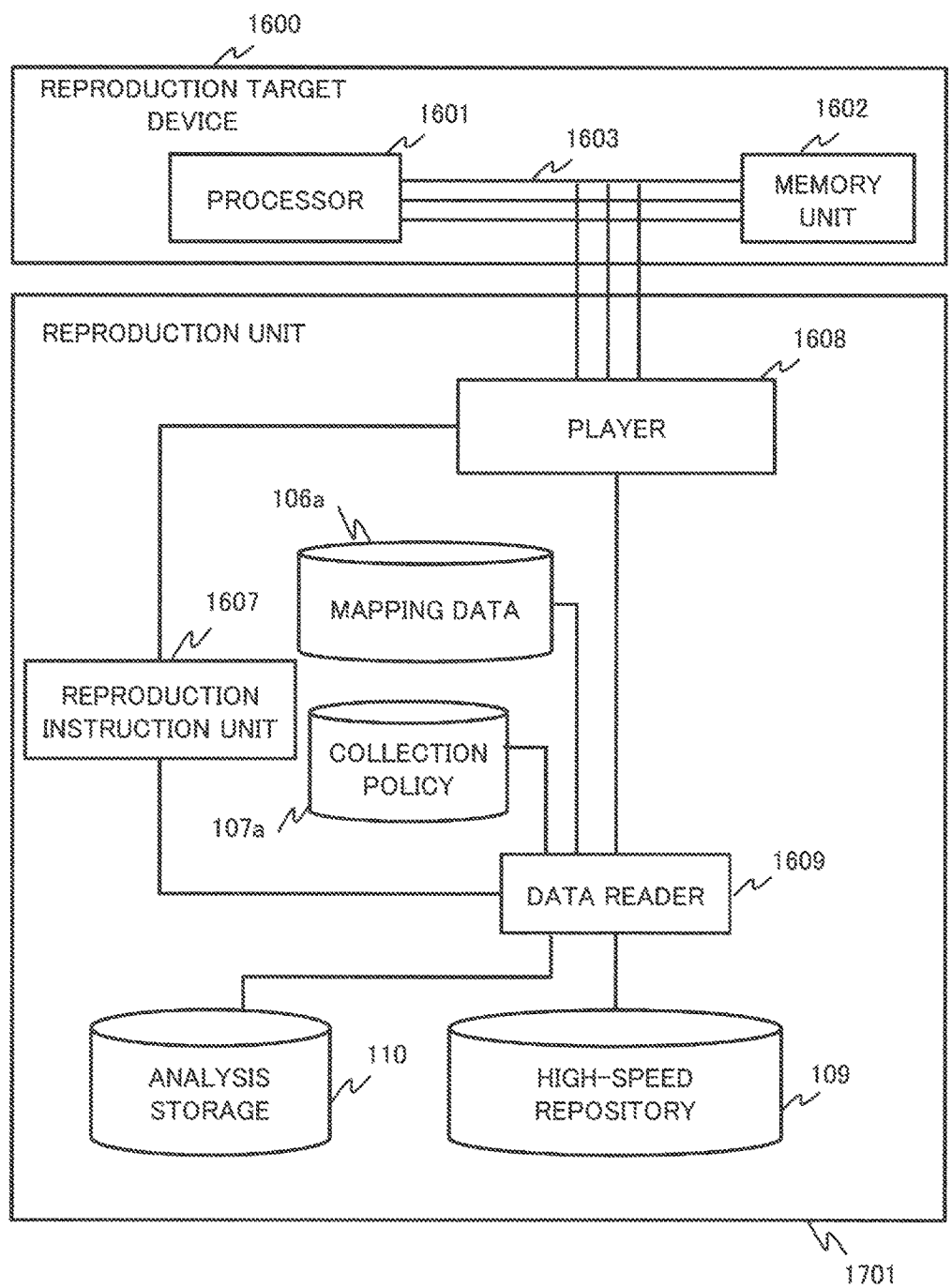
FIG. 17 is a block diagram illustrating another configuration example of an analysis device according to the second example embodiment of the present invention.

While the reproduction unit 1605 is provided as part of the analysis device 1604 in the configuration exemplified in FIG. 16 described above, the present example embodiment is not limited thereto. The reproduction unit 1605 according to the present example embodiment may be configured to be, for example, an independent reproduction device 1701 as exemplified in FIG. 17.

Figure 18:
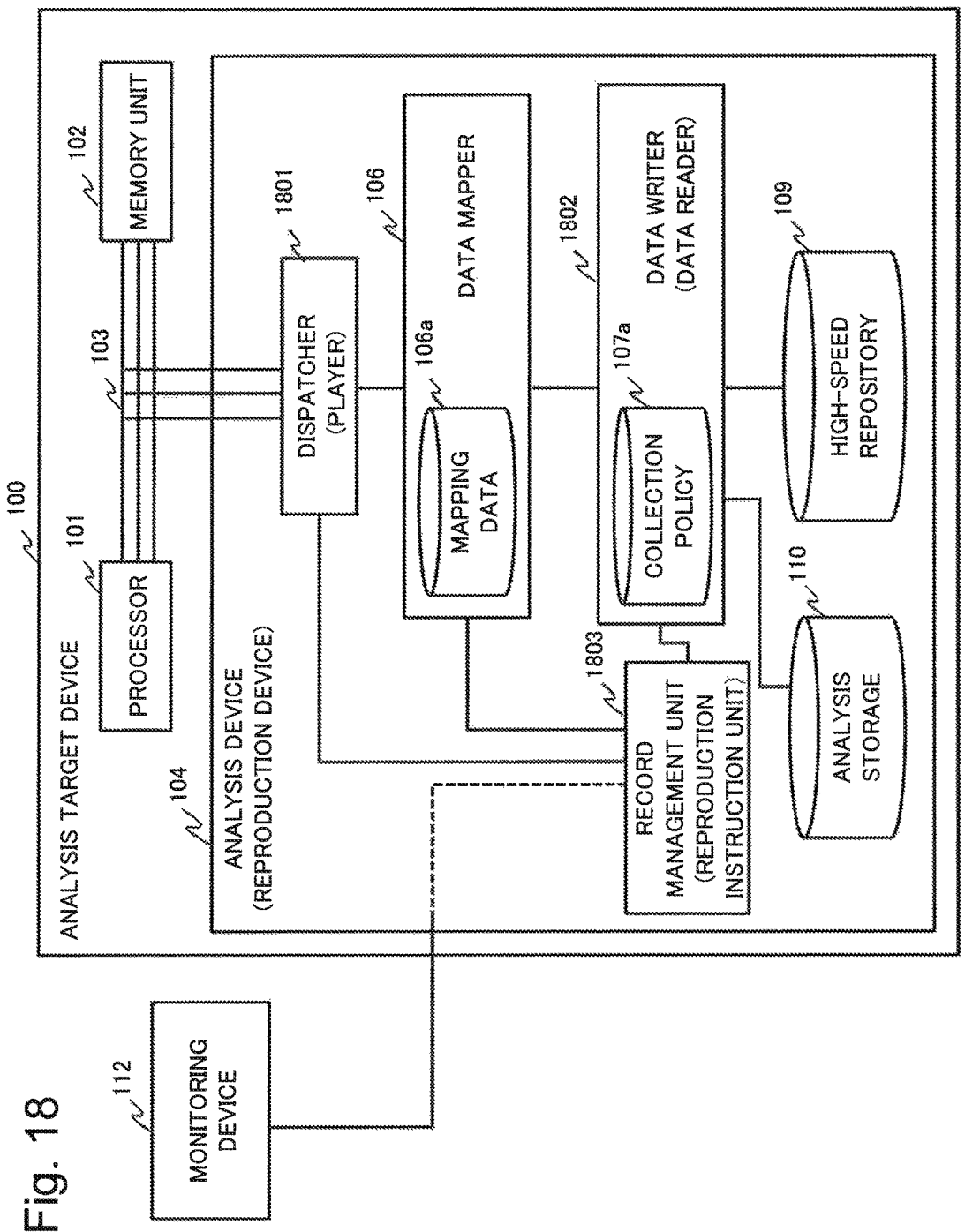
FIG. 18 is a block diagram illustrating yet another configuration example of an analysis device according to the second example embodiment of the present invention.

As further example, as exemplified in FIG. 18, respective components of the analysis device 104 according to the first example embodiment may be configured also to serve as components of the reproduction device. In this case, for example, a dispatcher 1801 corresponding to the dispatcher 105 according to the first example embodiment may be configured also to function as the player 1608. For example, a data writer 1802 corresponding to the data writer 107 according to the first example embodiment may be configured also to function as the data reader 1609. For example, a record management unit 1803 corresponding to the record management unit 108 according to the first example embodiment may be configured also to function as the reproduction instruction unit 1607.

In the following, an operation of the analysis device according to the present example embodiment configured as described above will be described. In particular, an operation of the reproduction unit 1605 will be described below with reference to a flowchart exemplified in FIG. 19.

First, a user, an administrator or the like (unillustrated) requests the reproduction instruction unit 1607 to reproduce an operating state of the analysis target device 100 at a specific timing, in the reproduction target device 1600.

In accordance with the request, the reproduction instruction unit 1607 transmits a reproduction request for instructing reproduction of the specific operating state in the analysis target device 100, to the player 1608 (Step S1901).

Next, the player 1608 requests reproduction data at the specific timing to the data reader 1609 (Step S1902). In this case, the player 1608 transmits information by which an operating state to be reproduced can be specified (such as time information indicating the specific timing, and label information), to the data reader 1609.

The data reader 1609 that has received the request in Step S1902 reads saved data into the high-speed repository 109 from the analysis storage 110 (Step S1903). In this case, the data reader 1609 reads saved data acquired or saved at a time closest to the specific timing specified in Step S1902, into the high-speed repository 109. The data reader 1609 may read saved data assigned with a specific label into the high-speed repository 109.

Next, the data reader 1609 generates reproduction data, in accordance with the saved data read into the high-speed repository 109, and transmits the generated reproduction data to the player (Step S1904). A specific method of generating reproduction data from saved data is as described above.

Next, the player 1608 loads (sets) the reproduction data received from the data reader 1609 in Step S1904 into the processor 1601 and the memory unit 1602 (Step S1905).

The reproduction unit 1605 according to the present example embodiment may continuously repeat Steps S1901 to S1905. In this case, saved data at the specific timing (or after the specific timing) are continuously read from the high-speed repository, and an operation of the analysis target device 100 is continuously reproduced in the reproduction target device 1600.

The reproduction unit 1605 according to the present example embodiment configured as described above is able to reproduce an operating state of the analysis target device 100 at a specific timing in the reproduction target device 1600, in accordance with saved data saved in the high-speed repository 109 or the analysis storage 110. Consequently, for example, a state of operational processing in the analysis target device 100 at the specific timing such as occurrence of an incident can be analyzed in another reproduction target device 1600.

Further, the reproduction unit 1605 is able to slow an operation (lower an operating clock) of the processor 1601 in the reproduction target device 1600. Consequently, it becomes easy to analyze an operating state reproduced in the reproduction target device 1600.

The analysis unit 1606 having a similar configuration to the analysis device 104 according to the first example embodiment saves saved data into the high-speed repository 109 and the analysis storage 110. Consequently, the analysis device according to the present example embodiment provides a similar effect to the first example embodiment.

In the above description, although it is described that the reproduction instruction unit 1607 notifies a reproduction request to the player 1608, the present example embodiment is not limited thereto. For example, the reproduction instruction unit 1607 may notify a reproduction request to the data reader 1609. The data reader 1609 may generate reproduction data, in accordance with such a reproduction request, and notify the reproduction data to the player 1608. In other words, a component in the reproduction unit 1605 that interprets a reproduction request can be appropriately selected.

Modified Example of Second Example Embodiment

Figure 20:
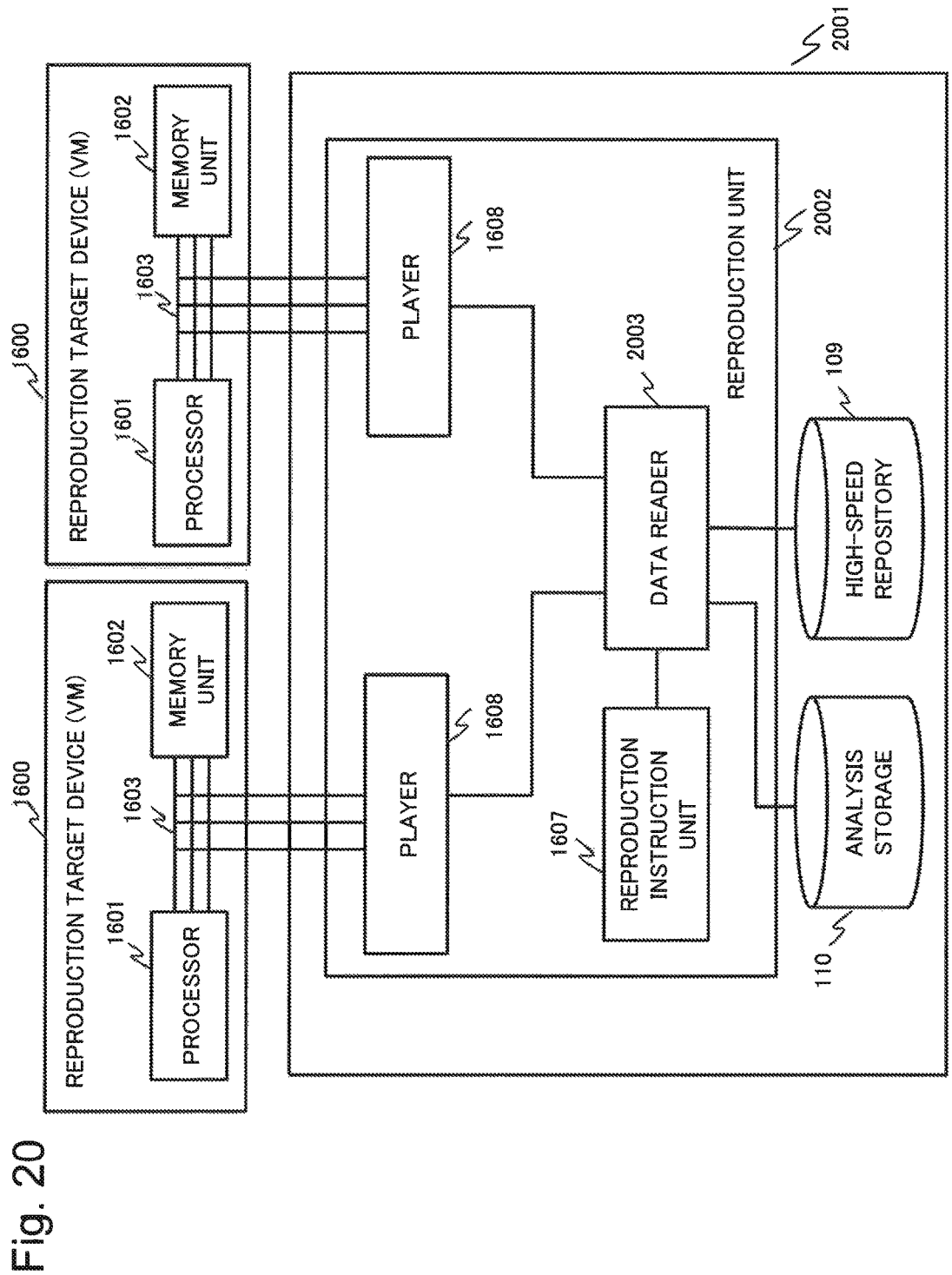
FIG. 20 is a block diagram exemplifying functional configurations of an analysis device and an analysis target device, according to a modified example of the second example embodiment of the present invention.

In the following, a modified example of the second example embodiment described above will be described. The present modified example differs from the second example embodiment, in that a plurality of reproduction target devices 1600 is included. The remaining configuration according to the present modified example may be similar to the second example embodiment. As exemplified in FIG. 20, a plurality of players 1608 is included, according to the present modified example. A configuration of the player 1608 itself may be similar to the second example embodiment, and therefore detailed description is omitted. In FIG. 20, some of the components of the analysis device 1604 exemplified in FIG. 16 are not illustrated for convenience of description. The components not illustrated in FIG. 20 may be considered similar to the components exemplified in FIG. 16, and therefore detailed description is omitted.

In accordance with requests from a plurality of players 1608, a data reader 2003 according to the present example embodiment provides reproduction data to each player 1608. In this case, the data reader 2003 may provide same reproduction data or may provide different reproduction data, to the plurality of players 1608.

Figure 19:
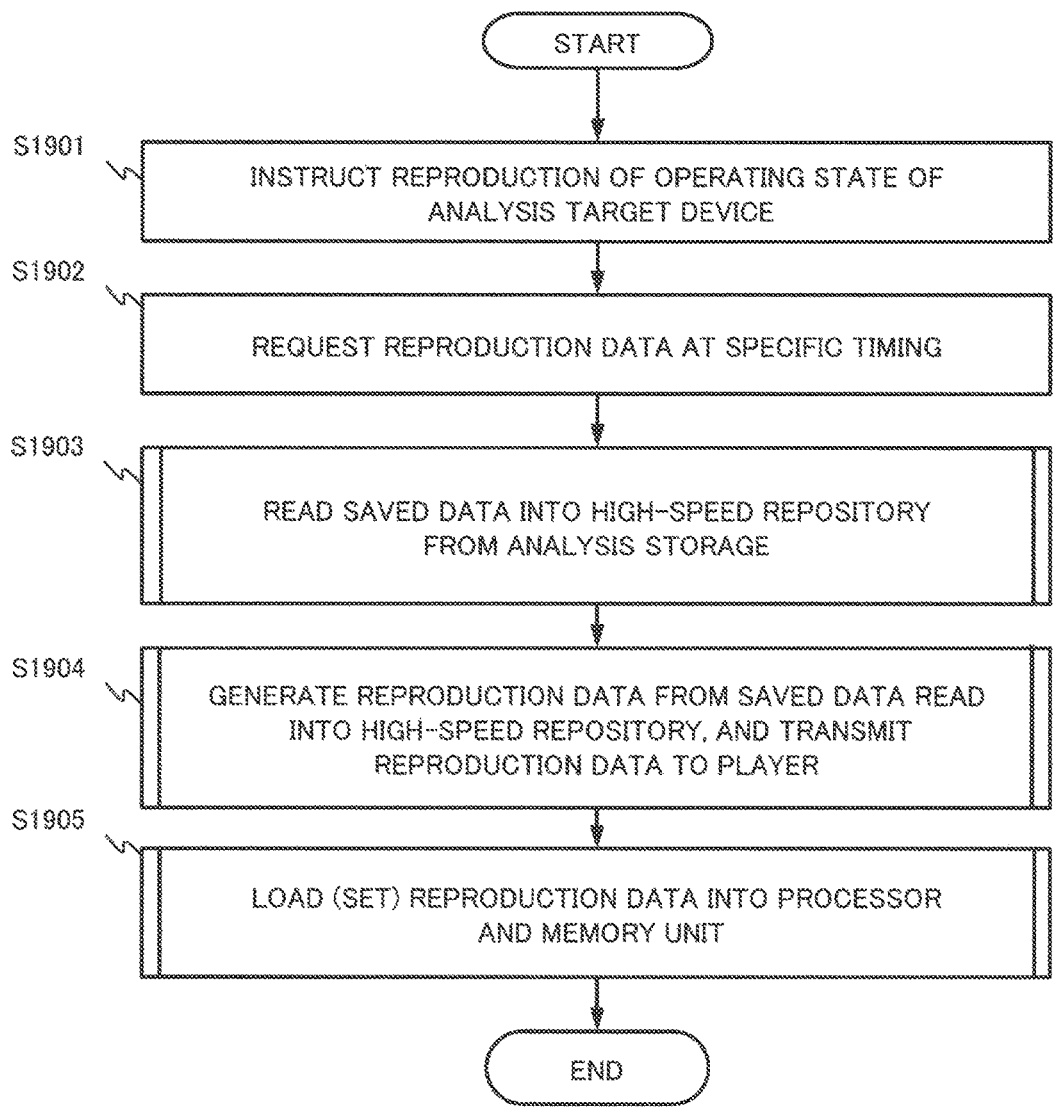
FIG. 19 is a flowchart exemplifying processing of the analysis device according to the second example embodiment of the present invention, for reproducing a state of operational processing in an analysis target device.

Specifically, in the flowchart exemplified in FIG. 19, Step S1902 is performed by a plurality of players 1608. The data reader 2003 is notified of requests for reproduction data from the plurality of players 1608.

In Step S1904 exemplified in FIG. 19, the data reader 2003 transmits reproduction data to each of the plurality of players 1608.

The remaining processing may be considered similar to the first example embodiment, and therefore detailed description is omitted.

A reproduction unit 2002 according to the present modified example is able to reproduce a specific operating state in the analysis target device 100 in a plurality of reproduction target devices 1600. The reason is that a player 1608 is provided for each of a plurality of reproduction target devices 1600, and the data reader 2003 transmits reproduction data to the plurality of players 1608.

Consequently, the reproduction unit 2002 according to the present modified example enables analysis of a state of operational processing in the analysis target device 100 by concurrently using a plurality of reproduction target devices 1600. Therefore, a time required for analysis processing can be reduced.

While two reproduction target devices 1600 are exemplified in the configuration exemplified in FIG. 20, the present example embodiment is not limited thereto. Any number of reproduction target devices 1600 may be employed.

Third Example Embodiment

Next, a third example embodiment of the present invention will be described.

Figure 21:
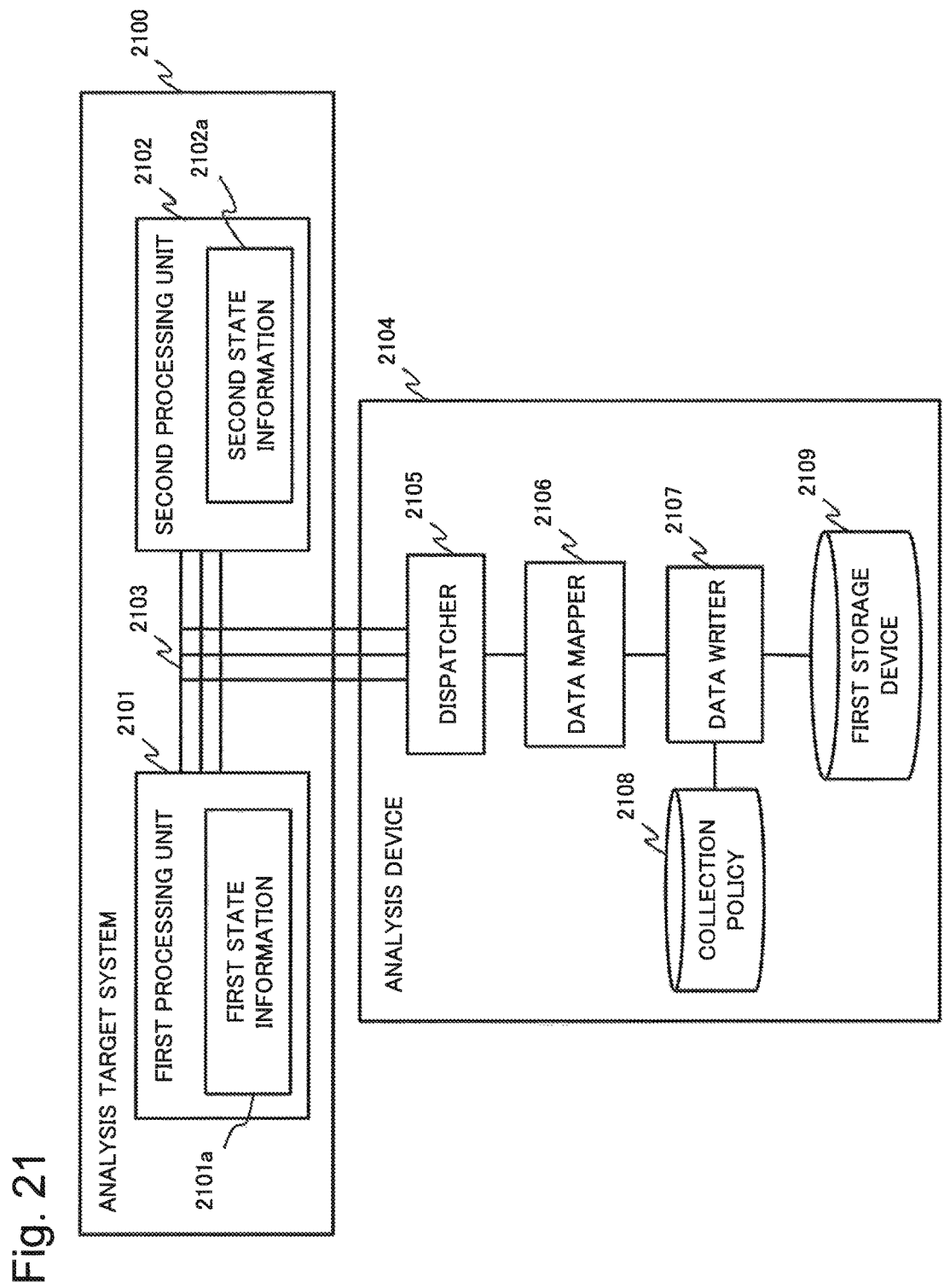
FIG. 21 is a block diagram exemplifying functional configurations of an analysis device and an analysis target device, according to a third example embodiment of the present invention.

First, an analysis device 2104 according to the present example embodiment will be described with reference to FIG. 21. FIG. 21 is a block diagram exemplifying a functional configuration of the analysis device 2104 according to the present example embodiment.

An analysis target system 2100 includes a first processing unit 2101 and a second processing unit 2102 communicably connected to the first processing unit. The first processing unit 2101 and the second processing unit 2102 may be communicably connected through any communication bus 2103.

The first processing unit 2101 performs any processing, and stores a state of the processing as first state information 2101*a*. The first state information 2101*a* according to the present example embodiment may be acquired or set from outside the first processing unit 2101.

The second processing unit 2102 performs any processing, and stores a state of the processing as second state information 2102*a*. The second state information 2102*a* according to the present example embodiment may be acquired or set from outside the second processing unit 2102.

Such first processing unit and second processing unit may be, for example, any devices communicably connected through any communication line (communication bus). More specifically, the first processing unit and the second processing unit may be, for example, various types of devices connected by a communication bus such as peripheral component interconnect (PCI), small computer system interface (SCSI), and universal serial bus (USB). Further, the first processing unit and the second processing unit may be, for example, devices including a communication function, and communicably connected by a wireless or wired communication network. For example, a local area network (LAN), the Internet, and the like may be employed as such a communication network.

The analysis device 2104 according to the present example embodiment analyzes a state of the analysis target system 2100 configured as described above. The analysis device 2104 includes a dispatcher 2105, a data mapper 2106, a data writer 2107, a collection policy 2108, and a first storage device 2109. Each component will be described below.

The dispatcher 2105 according to the present example embodiment is communicably connected to the first processing unit 2101 and the second processing unit 2102, and acquires data (transmission-reception target data) being transmitted and received between the first processing unit and the second processing unit.

The dispatcher 2105 may acquire the transmission-reception target data through the communication bus 2103. Further, the dispatcher 2105 may directly acquire the transmission-reception target data from the first processing unit 2101 and the second processing unit 2102.

Specifically, for example, the dispatcher 2105 may acquire various types of data and commands transmitted and received between the first processing unit 2101 and the second processing unit 2102, respectively being various types of devices connected to the communication bus such as a PCI bus. Further, for example, the dispatcher 2105 may acquire various types of data transmitted and received between the first processing unit 2101 and the second processing unit 2102, respectively being devices connected to any communication network.

The dispatcher 2105 generates collection target data that can reproduce a state of the analysis target system 2100, in accordance with the acquired data. It is assumed here that a state of the analysis target system 2100 according to the present example embodiment can be represented by use of at least either one of the first state information 2101a and the second state information 2102a. In other words, collection target data generated by the dispatcher 2105 include at least one of the first state information 2101a and the second state information 2102a at a specific time point.

In the following, the data mapper 2106 according to the present example embodiment will be described. The data mapper 2106 assigns, to one or more areas included in the collection target data generated in the dispatcher 2105, tag information that can identify the area.

For example, similarly to the data mapper 106 described in the first example embodiment, the data mapper 2106 divides the first state information 2101a included in collection target data into a plurality of areas. Specifically, the data mapper 2106 divides the first state information 2101a included in the collection target data into a plurality of areas, in accordance with a range of a storage area, in the first processing unit 2101, in which the first state information 2101a is saved. Then, the data mapper 2106 assigns tag information to each of the divided areas. Similarly, for example, the data mapper 2106 divides the second state information 2102a included in collection target data into a plurality of areas, in accordance with a range of a storage area, in the second processing unit 2102, in which the second state information 2102a included in the collection target data is saved. Then, the data mapper 2106 assigns tag information to each of the divided areas.

Further, not being limited to the above, for example, the data mapper 2106 may assign a tag to a specific area included in collection target data, depending on a type and an attribute of transmission-reception target data being a source of the collection target data. Specifically, for example, when the transmission-reception target data are data transmitted and received on a PCI bus, the data mapper 2106 may assign tag information to a specific area included in the collection target data, depending on a type of a PCI bus command included in the data.

Further, when the transmission-reception target data are communication packets transmitted and received in a communication network, the data mapper 2106 may assign tag information to a specific area included in the collection target data, depending on destination information of the communication packet. The specific area to which tag information is assigned may be predetermined, depending on a type of the transmission-reception target data.

In the following, the collection policy 2108 according to the present example embodiment will be described. The collection policy 2108 includes a first policy. Such a first policy is a policy defining a procedure of saving the collection target data assigned with the tag information into the first storage device 2109 with a certain storage capacity, in accordance with the tag information. The collection policy 2108 may be referred from the data writer 2107.

The collection policy 2108 may define a saving method so as to save a large amount of collection target data assigned with specific tag information, and to save a relatively small amount of collection target data assigned with another type of tag information.

In the following, the data writer 2107 according to the present example embodiment will be described. The data writer 2107 saves one or more areas to which the tag information is assigned by the data mapper 2106, into the first storage device 2109, in accordance with the first policy.

With the collection policy 2108 and the data writer 2107, being configured as described above, the analysis device 2104 is able to, for example, record only a specific area in collection target data. Further, the analysis device 2104 is able to, for example, change a saving method for each area in collection target data. That is, the analysis device 2104 is able to adjust a size and a saving method of saved data saved in the first storage device 2109. Consequently, the analysis device 2104 is able to economize on a storage capacity of the first storage device 2109 to accumulate a larger amount of saved data.

In the following, the first storage device 2109 according to the present example embodiment will be described. The first storage device 2109 is a storage device having a certain storage capacity.

The analysis device 2104 according to the present example embodiment configured as described above generates collection target data representing a state of the analysis target system 2100 from transmission-reception target data being transmitted and received between the first processing unit 2101 and the second processing unit 2102. Then, the analysis device 2104 stores at least part of the collection target data into the first storage device 2109 with a certain capacity, in accordance with the collection policy 2108 defining a method of saving the collection target data.

Since the analysis device 2104 is able to change a saving method for each area in collection target data, a storage area in the first storage device 2109 with a certain storage capacity can be effectively used. In other words, the analysis device 2104 according to the present example embodiment is able to save a larger amount of data by which a state of the analysis target system 2100 can be reproduced, by use of a storage device with a limited storage capacity.

The analysis device 2104 according to the present example embodiment may be combined with the analysis devices (104, 1604, and 2001) according to the aforementioned respective example embodiments. That is, the analysis device (104, 1604, or 2001) according to each of the aforementioned example embodiments saves data by which a state of operational processing in the processor and the memory unit constituting the analysis target device (analysis target system) can be reproduced. In addition, the analysis device 2104 according to the present example embodiment saves data by which a state of another component (such as a device other than the processor and the memory unit) constituting the analysis target device (analysis target system) can be reproduced.

Consequently, for example, when the analysis device according to each of the aforementioned example embodiments reproduces a state of operational processing in the analysis target device (analysis target system), a state of another component in the analysis target device can be additionally reproduced. In this case, states of the processor, the memory unit, and the other component in the analysis target device are reproduced, and therefore an operating state of the analysis target device can be more precisely reproduced.

Fourth Example Embodiment

Next a fourth example embodiment of the present invention will be described.

Figure 22:
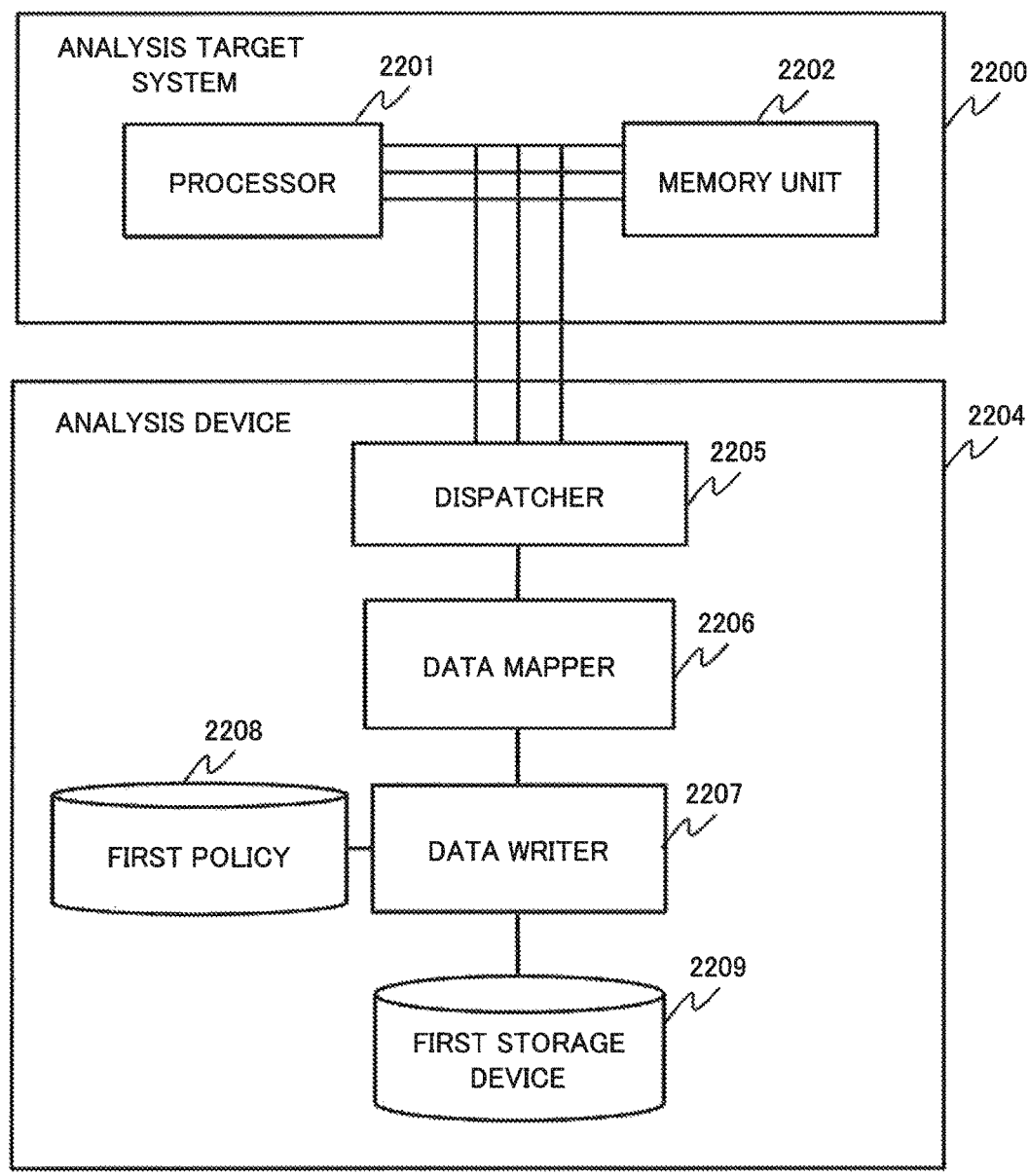
FIG. 22 is a block diagram exemplifying functional configurations of an analysis device and an analysis target device, according to a fourth example embodiment of the present invention.

In the following, an analysis target device 2200 and an analysis device 2204, according to the present example embodiment, will be described with reference to FIG. 22.

The analysis target device 2200 includes a processor 2201 and a memory unit 2202 communicably connected to the processor. The analysis target device performs any operational processing by use of the processor 2201 and the memory unit 2202.

The analysis device 2204 includes a dispatcher 2205, a data mapper 2206, a data writer 2207, a holding unit including a first policy 2208, and a first storage device 2209. Each component will be described below.

First, the dispatcher 2205 according to the present example embodiment is communicably connected to the analysis target device 2200. In this case, the dispatcher 2205 may be communicably connected to the processor 2201 and the memory unit 2202. The dispatcher 2205 generates collection target data which can reproduce at least part of a state of operational processing in the analysis target device 2200, in accordance with data being transmitted and received between the processor 2201 and the memory unit 2202 ("transmission-reception target data").

The dispatcher 2205 according to the present example embodiment may be similar to the dispatcher 105 according to the first example embodiment.

In the following, the data mapper 2206 according to the present example embodiment will be described. The data mapper 2206 assigns, to one or more areas included in the collection target data generated in the dispatcher 2205, tag information for identifying the area. The data mapper 2206 may acquire the collection target data from the dispatcher 2205. Further, the dispatcher 2205 may set the collection target data to the data mapper 2206.

The data mapper 2206 according to the present example embodiment may be, for example, similar to the data mapper 106 according to the first example embodiment.

Next, the first policy 2208 according to the present example embodiment will be described. The first policy 2208 defines a procedure of saving collection target data into the first storage device 2209 with a certain storage capacity, by use of tag information. The first policy 2208 may be referable from the data writer 2207.

The first policy 2208 according to the present example embodiment may be, for example, similar to the collection policy 107a according to the first example embodiment.

In the following, the data writer 2207 according to the present example embodiment will be described. The data writer 2207 saves the one or more areas into the first storage device 2209, in accordance with the first policy. The data writer 2207 may acquire collection target data from the data mapper 2206. Further, the data mapper 2206 may set collection target data to the data writer 2207.

The data writer 2207 according to the present example embodiment may be, for example, similar to the data writer 107 according to the first example embodiment.

In the following, the first storage device 2209 according to the present example embodiment will be described. The first storage device 2209 is a storage device with a certain storage capacity. The first storage device 2209 may acquire data being a save target from the data writer 2207. Further, the data writer 2207 may set (write) data being a save target into the first storage device 2209.

The first storage device 2209 according to the present example embodiment may be, for example, similar to the high-speed repository 109 according to the first example embodiment.

The first policy 2208 and the first storage device 2209, according to the present example embodiment, may be provided by any external apparatus communicably connected to the analysis device 2204. In other words, arrangement of the first policy 2208 and the first storage device 2209 may be appropriately determined.

The analysis device 2204 according to the present example embodiment configured as described above generates collection target data representing a state of the analysis target device 2200, from transmission-reception target data being transmitted and received between the processor 2201 and the memory unit 2202. Then, the analysis device 2204 stores (saves) one or more areas included in the collection target data into the first storage device 2209 with a certain capacity, in accordance with the first policy 2208 which defines a method for saving the collection target data.

The analysis device 2204 according to the present example embodiment is able to change a saving method for each area included in collection target data, in accordance with the first policy 2208. Consequently, the analysis device 2204 is able to effectively use a storage area in the first storage device 2209 with a certain storage capacity. In other words, the analysis device 2204 according to the present example embodiment is able to save a larger amount of data by which a state of the analysis target device 2200 can be reproduced, by use of a storage device with a limited storage capacity.

Configurations of Hardware and Software Program (Computer Program)

A hardware configuration capable of providing the respective example embodiments described above will be described below.

In the description below, the analysis devices (reference signs 104, 1604, 2104, and 2204) may be collectively referred to as the "analysis device." Each of the components of the data analysis device may be collectively referred to as a "component of the analysis device." Such a component of the analysis device may include, for example, the dispatcher (such as reference signs 105, 1801, 2105, and 2205). Such a component of the analysis device may include, for example, the data mapper (such as reference signs 106, 2106, and 2206). Such a component of the analysis device may include, for example, the data writer (such as reference signs 107, 1301, 1802, 2107, and 2207). Such a component of the analysis device may include, for example, the collection policy (such as reference signs 107a, 1301a, and 2108), or the first policy (such as reference sign 2208). Such a component of the analysis device may include, for example, the high-speed repository or the first storage device (reference signs 109, 2109, and 2209). Such a component of the analysis device may include, for example, the analysis storage (reference sign 110), the player (reference sign 1608), the data reader (reference signs 1609 and 2003), and the reproduction instruction unit (reference sign 1607).

The analysis device described in each of the aforementioned example embodiments may be configured by a dedicated hardware apparatus. In that case, respective components illustrated in the aforementioned drawings may be provided as hardware (such as an integrated circuit implemented with processing logic) integrating the components in part or in whole.

For example, when respective components are provided by hardware, an integrated circuit capable of providing functions of the components may be implemented by a system-on-a-chip (SoC) or the like. In this case, for example, data held by the respective components may be stored in an RAM area or a flash memory area integrated as an SoC.

In this case, a known communication bus may be employed as a communication line connecting the respective components. Further, the communication line connecting the respective components is not limited to bus connection, and the respective components may be interconnected on a peer-to-peer basis.

Figure 23:
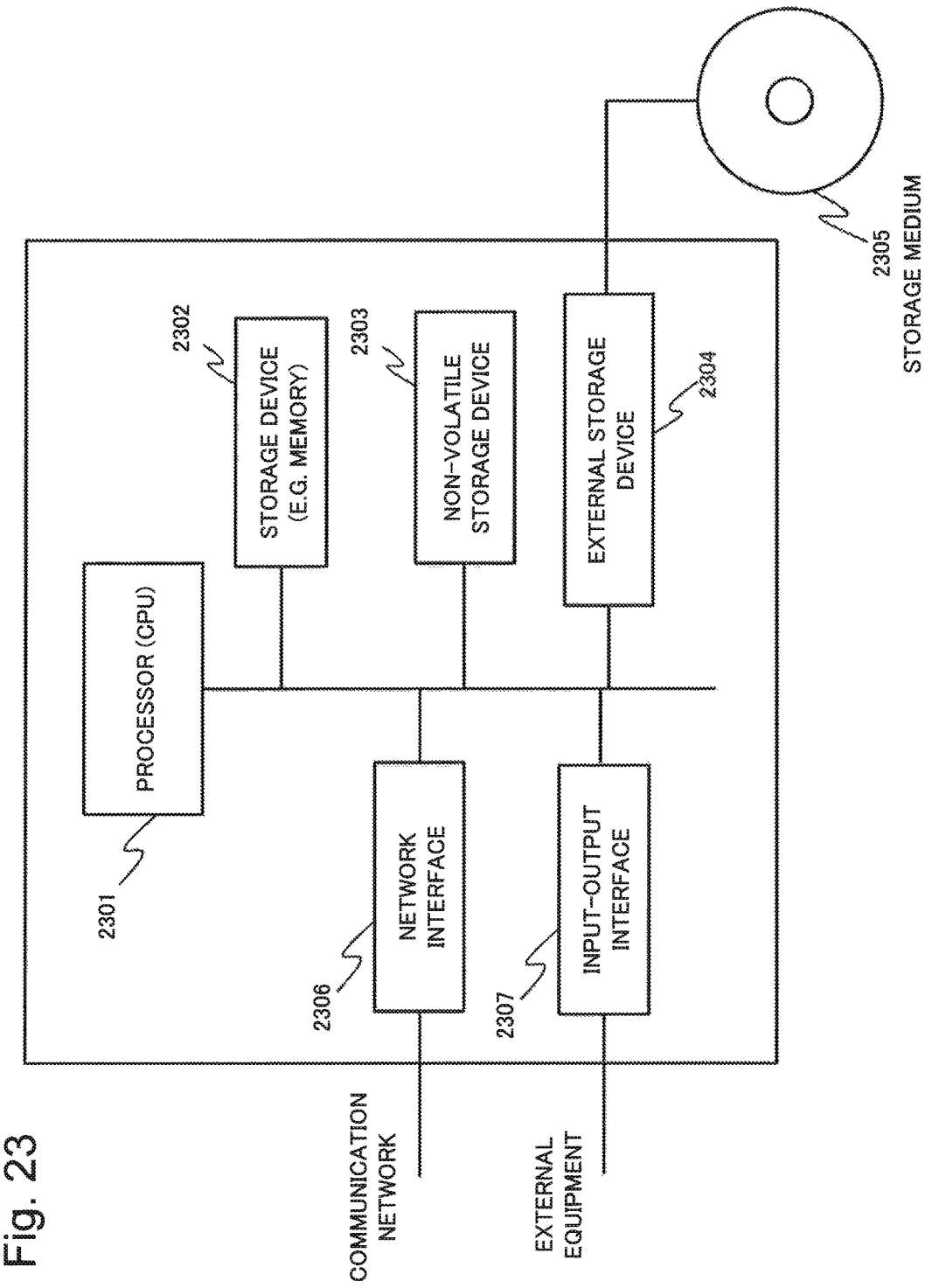
FIG. 23 is a block diagram exemplifying a hardware configuration of an information processing apparatus capable of providing respective components of the analysis devices according to the respective example embodiments of the present invention.

Further, the aforementioned analysis device may be configured with hardware as exemplified in FIG. 23 and various types of software programs (computer programs) executed by such hardware.

A processor 2301 in FIG. 23 is an processing device such as a general-purpose central processing unit (CPU) and a microprocessor. The processor 2301 may, for example, read various types of software programs stored in a non-volatile storage device 2303 (to be described later) into a storage device 2302, and perform processing, in accordance with such software programs.

The storage device 2302 is a memory device such as a random access memory (RAM), being referable from the processor 2301, and stores a software program, various types of data, and the like. The storage device 2302 may be a volatile memory.

The non-volatile storage device 2303 is, for example, a non-volatile storage device such as a magnetic disk drive and a semiconductor storage device with a flash memory. The non-volatile storage device 2303 may record (save) various types of software programs, data, and the like.

A network interface 2306 is an interface device connecting to a communication network. For example, an interface device for wired and wireless local area network (LAN) connection, or the like may be employed as the network interface 2306.

For example, the analysis device according to the respective example embodiments may be communicably connected to the monitoring device (reference sign 112) used by a user of the analysis device (unillustrated), or the sensor (reference sign 111), through the network interface 2306.

An external storage device 2304 is, for example, a device performing read and write processing of data with respect to an external storage medium 2305 (to be described later).

The external storage medium 2305 is, for example, any data-recordable storage medium such as an optical disk, a magneto-optical disk, and a semiconductor flash memory.

An input-output interface 2307 is a device controlling input from and output to an external apparatus.

For example, an input from the sensor 111 according to the respective example embodiments may be input to the record management unit (such as reference sign 108) through the input-output interface 2307.

The present invention described with the respective example embodiments as examples may be provided by configuring the analysis device with the hardware apparatus exemplified in FIG. 23, and supplying a software program capable of providing a function described in the respective example embodiments to such an apparatus. In this case, the present invention may be achieved by the processor 2301 executing the software program supplied to such an apparatus.

Each unit illustrated in each drawing according to the aforementioned example embodiments can be provided as a software module that is a function (processing) unit of the software program executed by the aforementioned hardware. However, allocation of each software module illustrated in the drawings is a configuration for convenience of description, and various configurations may be considered in implementation.

For example, when respective units exemplified in FIGS. 1, 2, 12, 13, 16, 17, 18, 20, 21, and 22 are provided as software modules, the software modules may be stored in the non-volatile storage device 2303. Then, the processor 2301 may read the software modules into the storage device 2302 when each type of processing is executed.

Further, the software modules may be configured to transfer various types of data to one another by use of an appropriate method such as a shared memory and inter-process communication. With such a configuration, the software modules can be communicably connected with one another.

The respective software programs may be recorded in the external storage medium 2305. The analysis device may be so configured that the software programs are stored in the non-volatile storage device 2303 through the external storage device 2304, in a shipping stage or an operating stage of the analysis device.

The mapping data (reference sign 106a), the collection policy (reference signs 107a, 1301a, and 2108), and the first policy (such as reference sign 2208) described in the respective example embodiments may be stored in the storage device 2302 and the non-volatile storage device 2303 by use of a suitable file system, a database, and the like.

In the case described above, a supply method of various types of software programs to the analysis device may employ a method of installation into the device by use of an appropriate tool, in a manufacturing stage before shipping, a maintenance stage after shipping, or the like. Further, the supply method of various types of software programs may employ a currently common procedure such as an external downloading method through a communication line such as the Internet.

In such a case, the present invention may be considered to be configured with a code constituting a software program, or a computer-readable storage medium in which such a code is recorded.

The present invention has been described above as examples applied to the aforementioned exemplary example embodiments. However, the technical scope of the present invention is not limited to the respective aforementioned example embodiments. It is obvious to a person skilled in the art that various changes or modifications can be made to such example embodiments. In such a case, a new example embodiment with such a change or modification can be included in the technical scope of the present invention. Further, an example embodiment combining the respective example embodiments described above can be included in the technical scope of the present invention. This is obvious from matters described in CLAIMS.

INDUSTRIAL APPLICABILITY

The present invention is applicable to, for example, an analysis processing apparatus analyzing an operation state of an information processing apparatus, and the like. More specifically, for example, the present invention is applicable to an analysis device capable of providing a live forensics technique of analyzing an execution state of a malicious program in an information processing apparatus, and the like.

This application claims priority based on Japanese Patent Application No. 2014-131309 filed on Jun. 26, 2014, the disclosure of which is hereby incorporated by reference thereto in its entirety.

REFERENCE SIGNS LIST

100 Analysis target device
101 Processor
102 Memory unit
103 Communication bus
104 Analysis device
105 Dispatcher
106 Data mapper
106a Mapping data
107 Data writer
107a Collection policy
108 Record management unit
109 High-speed repository
110 Analysis storage
111 Sensor
112 Monitoring device
200 VMM
1201 Map generator
1301 Data writer
1301a Collection policy
1600 Reproduction target device
1601 Processor
1602 Memory unit
1603 Communication bus
1604 Analysis device
1605 Reproduction unit
1607 Reproduction instruction unit
1608 Player
1609 Data reader
1701 Reproduction device
1801 Dispatcher
1802 Data writer
1803 Record management unit
2001 Analysis device
2002 Reproduction unit
2003 Data reader
2100 Analysis target system
2101 First processing unit
2102 Second processing unit
2104 Analysis device
2105 Dispatcher
2106 Data mapper
2107 Data writer
2108 Collection policy
2109 First storage device
2200 Analysis target device
2201 Processor
2202 Memory unit
2204 Analysis device
2205 Dispatcher
2206 Data mapper
2207 Data writer
2208 First policy
2209 First storage device
2301 Processor
2302 Storage device
2303 Non-volatile storage device
2304 External storage device
2305 External storage medium
2306 Network interface
2307 Input-output interface

What is claimed is:

1. An analysis apparatus comprising:
a first storage device configured to store data; and
one or more processing circuitry configured to control the analysis apparatus to function as:
a dispatcher that is configured to be communicably connected to an analysis target device that performs operational processing by use of a processor and a memory unit, which is connected to the processor, and to generate collection target data for reproducing at least part of a state of the operational processing in the analysis target device, in accordance with data being transmitted and received between the processor and the memory unit;
a data mapper that is configured to assign, to one or more areas included in the collection target data, tag information for identifying the area; and
a data writer that is configured to save the one or more areas into the first storage device, in accordance with a first policy defining a procedure of saving the collection target data into the first storage device, the area being specified by use of the tag information assigned,
wherein the first policy includes information for specifying a storage area into which saved data associated with a piece of the tag information are saved in the first storage device, and information indicating a saving method used for saving the saved data into the storage area,
wherein the data writer saves the saved data into the first storage device, in accordance with the saving method included in the first policy,
wherein the first policy includes at least one of save not required, ring buffer, duplicate and append,
wherein the data writer saves the saved data that indicates a relation between the tag information, save-target data that are included in the one or more areas assigned with the tag information, and record timing information, into the first storage device, the record timing information indicating a timing when the saved data is recorded,
wherein the data mapper assigns the tag information with respect to the one or more areas included in the collection target data, in accordance with mapping data indicating a relation between information for specifying the one or more areas which are included in the collection target data, and the tag information for identifying the area, wherein the processing circuitry of the analysis apparatus controls the analysis apparatus further to function as:
a data reader that is configured:
to extract one or more pieces of the saved data saved in the first storage device,
to extract the tag information, being set to the piece of the saved data, and the save-target data, for each of the extracted one or more pieces of the saved data, and,
to generate, by referring to the mapping data, reproduction data in which the extracted save-target data are arranged in an area associated with the extracted tag information; and
a player that is configured:
to be communicably connected to a reproduction target device performing operational processing by use of a processor and a memory unit which is communicably connected to the processor,
in accordance with the reproduction data generated in the data reader, to load data, stored in the memory unit in the analysis target device, into a memory unit in the reproduction target device, when the reproduction data include the data stored in the memory unit in the analysis target device, and
in accordance with the reproduction data generated in the data reader, to load data, included in the reproduction data and representing an operating state of the processor in the analysis target device, into the processor in the reproduction target device, when the reproduction data include the data representing the operating state of the processor in the analysis target device, and
wherein the processing circuitry of the analysis apparatus controls the analysis apparatus further to function as:
at least a same number of the players as a plurality of the reproduction target devices, when a plurality of the reproduction target devices exist,
wherein the players different from one another among a plurality of the players are communicably connected to the respective reproduction target devices among the plurality of the reproduction target devices, and
in accordance with the reproduction data generated in the respective data reader, each of the plurality of the players,
loads data stored in the memory unit in the analysis target device into a memory unit in the reproduction target device connected to the player, when the data stored in the memory unit in the analysis target device are included in the reproduction data, and
loads data representing an operating state of the processor in the analysis target device into a processor in the reproduction target device connected to the player, when data representing the operating state of the processor in the analysis target device are included in the reproduction data.

2. The analysis apparatus according to claim 1, wherein the collection target data include at least one of the data representing the operating state of the processor and the data stored in the memory unit, when the data being a source of the collection target data is acquired.

3. The analysis apparatus according to claim 1, wherein the saving method of the saved data is a method that is able to specify an area into which a new piece of the saved data is saved, among areas into which the saved data are saved in the first storage device.

4. The analysis apparatus according to claim 1, wherein the mapping data indicate a relation between memory-area specification information that specifies one or more areas which are included in the collection target data, based at least part on an area in the memory unit into which stored data which are included in the collection target data are stored, and the tag information for identifying the one or more areas which are included in the collection target data, and
the data mapper assigns the tag information with respect to the one or more areas included in the collection target data, in accordance with the mapping data.

5. The analysis apparatus according to claim 4, wherein the processing circuitry of the analysis apparatus controls the analysis apparatus further to function as:
a map generator that is configured to
divide stored data included in the collection target data into a plurality of areas, in accordance with information representing an architecture of the analysis target device, and
generate the mapping data indicating, for each of a plurality of the divided areas, a relation between the memory-area specification information for specifying the divided area, and the tag information for identifying an area specified by the memory-area specification information.

6. The analysis apparatus according to claim 1, further comprising a second storage device having a larger storage capacity than the first storage device, wherein
the data writer saves the saved data being saved in the first storage device into the second storage device, in accordance with a second policy defining a procedure of saving the saved data saved in the first storage device into the second storage device.

7. The analysis apparatus according to claim 6, wherein the second policy includes accumulation necessity information for specifying whether or not to save the saved data saved in the first storage device into the second storage device, and accumulation method information for at least specifying a trigger for saving the saved data saved in the first storage device into the second storage device, and,
when the data writer determines to save the saved data saved in the first storage device into the second storage device, in accordance with the accumulation necessity information set to the second policy, the data writer saves at least part of the saved data saved in the first storage device into the second storage device, by detecting the trigger in accordance with the accumulation method information.

8. The analysis apparatus according to claim 6, wherein when deleting the saved data, from the first storage device, being already saved in the first storage device, the data writer determines whether or not to save the saved data to be deleted from the first storage device into the second storage device, in accordance with the first policy or the second policy, and saves the saved data to be deleted from the first storage device, into the second storage device in accordance with the determination.

9. The analysis apparatus according to claim 6 wherein the processing circuitry of the analysis apparatus controls the analysis apparatus further to function as:

record management unit that is configured to notify the data writer of a request for saving the saved data saved in the first storage device into the second storage device, wherein the data writer saves the saved data saved in the first storage device into the second storage device, in accordance with the request received from the record management unit.

10. The analysis apparatus according to claim 9, wherein the record management unit is configured to be communicably connected to a sensor for detecting a predetermined event that can affect operational processing in the analysis target device, and to notify the data writer of the request, in accordance with detection information about the predetermined event being notified by the sensor.

11. The analysis apparatus according to claim 1, wherein the processing circuitry of the analysis apparatus controls the analysis apparatus further to function as:
at least a same number of the dispatchers as the analysis target devices, and at least a same number of the data mappers as the dispatchers, when a plurality of the analysis target devices exist, wherein
different dispatchers are communicably connected to a plurality of the analysis apparatuses respectively,
different mappers assign, to one or more areas included in the collection target data generated respectively in the different dispatchers, tag information for identifying the area,
the first policy includes, for each of one or more pieces of the tag information, information for identifying the different dispatchers, and
the data writer saves the one or more areas included in the collection target data into the first storage device as the saved data, in accordance with the first policy.

12. The analysis apparatus according to claim 1, wherein the data reader reads, by referring to the first storage device, one or more pieces of the saved data having the record timing information to which a same timing is set, among the saved data saved in the first storage device.

13. The analysis apparatus according to claim 12, wherein when loading the reproduction data into the processor in the reproduction target device or the memory unit in the reproduction target device, the player lowers a processing speed of the processor in the reproduction target device.

14. The analysis apparatus according to claim 1 wherein the dispatcher generates the collection target data, in accordance with a sampling interval being set.

15. The analysis apparatus according to claim 1, wherein the saving method of the saved data is
a method that is able to determine whether or not a new piece of the saved data can be saved into an area in which the saved data are already saved in the first storage device.

16. An analysis apparatus comprising:
a first storage device configured to store data; and
one or more processing circuitry configured to control the analysis apparatus to function as:
a dispatcher that is configured to:
be communicably connected to an analysis target system including a first processing unit performing processing and storing a state of the processing as first state information, and a second processing unit communicably connected to the first processing unit performing processing and storing a state of the processing as second state information,
acquire data being transmitted and received between the first processing unit and the second processing unit, and,
in accordance with the acquired data, generate collection target data for reproducing a state of the analysis target system, by reproducing at least one of the first state information and the second state information;
a data mapper that is configured to assign, to one or more areas included in the collection target data, tag information for identifying the area; and
a data writer that is configured to save the one or more areas into the first storage device, in accordance with a first policy defining a procedure of saving the collection target data into the first storage device, the area being specified by use of the tag information assigned,
wherein the first policy includes information for specifying a storage area into which saved data associated with a piece of the tag information are saved in the first storage device, and information indicating a saving method used for saving the saved data into the storage area,
wherein the data writer saves the saved data into the first storage device, in accordance with the saving method included in the first policy, and
wherein the first policy includes at least one of save not required, ring buffer, duplicate and append,
wherein the data writer saves the saved data that indicates a relation between the tag information, save-target data that are included in the one or more areas assigned with the tag information, and record timing information, into the first storage device, the record timing information indicating a timing when the saved data is recorded,
wherein the data mapper assigns the tag information with respect to the one or more areas included in the collection target data, in accordance with mapping data indicating a relation between information for specifying the one or more areas which are included in the collection target data, and the tag information for identifying the area,
wherein the processing circuitry of the analysis apparatus controls the analysis apparatus further to function as:
a data reader that is configured:
to extract one or more pieces of the saved data saved in the first storage device,
to extract the tag information, being set to the piece of the saved data, and the save-target data, for each of the extracted one or more pieces of the saved data, and,
to generate, by referring to the mapping data, reproduction data in which the extracted save-target data are arranged in an area associated with the extracted tag information; and
a player that is configured:
to be communicably connected to a reproduction target device performing operational processing by use of a processor and a memory unit which is communicably connected to the processor,
in accordance with the reproduction data generated in the data reader, to load data, stored in the memory unit in the analysis target system, into a memory unit in the reproduction target device, when the reproduction data include the data stored in the memory unit in the analysis target system, and
in accordance with the reproduction data generated in the data reader, to load data, included in the reproduction data and representing an operating state of the processor in the analysis target system, into the processor in the reproduction target device, when the reproduction data include the data representing the operating state of the processor in the analysis target system, and wherein the processing circuitry of the analysis apparatus controls the analysis apparatus further to function as:

at least a same number of the players as a plurality of the reproduction target devices, when a plurality of the reproduction target devices exist, wherein the players different from one another among a plurality of the players are communicably connected to the respective reproduction target devices among the plurality of the reproduction target devices, and in accordance with the reproduction data generated in the respective data reader, each of the plurality of the players, loads data stored in the memory unit in the analysis target system into a memory unit in the reproduction target device connected to the player, when the data stored in the memory unit in the analysis target system are included in the reproduction data, and loads data representing an operating state of the processor in the analysis target system into a processor in the reproduction target device connected to the player, when data representing the operating state of the processor in the analysis target system are included in the reproduction data.

17. An analysis method comprising, by an information processing apparatus:

generating collection target data for reproducing at least part of a state of operational processing in an analysis target device, in accordance with data being transmitted and received between a processor and a memory unit being connected to the processor in the analysis target device that performs operational processing by use of the processor and the memory unit;

assigning, with respect to one or more areas included in the collection target data, tag information for identifying the area; and saving the one or more areas into a first storage device configured to store data, in accordance with a first policy defining a procedure of saving the collection target data into the first storage device, the area being specified by use of the tag information assigned, wherein the first policy includes information for specifying a storage area into which saved data associated with a piece of the tag information are saved in the first storage device, and information indicating a saving method used for saving the saved data into the storage area, wherein the saving the one or more areas comprises saving the saved data into the first storage device, in accordance with the saving method included in the first policy, and wherein the first policy includes at least one of save not required, ring buffer, duplicate and append, wherein the saving the one or more areas comprises saving the saved data that indicates a relation between the tag information, save-target data that are included in the one or more areas assigned with the tag information, and record timing information, into the first storage device, the record timing information indicating a timing when the saved data is recorded, wherein the assigning comprises assigning the tag information with respect to the one or more areas included in the collection target data, in accordance with mapping data indicating a relation between information for specifying the one or more areas which are included in the collection target data, and the tag information for identifying the area, the analysis method further comprising:

extracting one or more pieces of the saved data saved in the first storage device, extracting the tag information, being set to the piece of the saved data, and the save-target data, for each of the extracted one or more pieces of the saved data, and generating, by referring to the mapping data, reproduction data in which the extracted save-target data are arranged in an area associated with the extracted tag information, in accordance with the reproduction data generated in a data reader, loading data, stored in the memory unit in the analysis target device, into a memory unit in a reproduction target device, when the reproduction data include the data stored in the memory unit in the analysis target device, and in accordance with the reproduction data generated in the data reader, loading data, included in the reproduction data and representing an operating state of the processor in the analysis target device, into a processor in the reproduction target device, when the reproduction data include the data representing the operating state of the processor in the analysis target device, and controlling an analysis apparatus to function as:

at least a same number of players as a plurality of the reproduction target devices, when a plurality of the reproduction target devices exist, wherein the players different from one another among a plurality of the players are communicably connected to the respective reproduction target devices among the plurality of the reproduction target devices, and in accordance with the reproduction data generated in the respective data reader, each of the plurality of the players performing, loading data stored in the memory unit in the analysis target device into a memory unit in the reproduction target device connected to a player, when the data stored in the memory unit in the analysis target device are included in the reproduction data, and loading data representing an operating state of the processor in the analysis target device into a processor in the reproduction target device connected to the player, when data representing the operating state of the processor in the analysis target device are included in the reproduction data.

18. A non-transitory computer readable storage medium recording a computer program causing a computer that is configured to analyze a state of operational processing in an analysis target device that performs operational processing by use of a processor and a memory unit connected to the processor, to perform:

processing of generating collection target data for reproducing at least part of a state of operational processing in the analysis target device, in accordance with data being transmitted and received between the processor and the memory unit in the analysis target device;

processing of assigning, with respect to one or more areas included in the collection target data, tag information for identifying the area; and processing of saving the one or more areas into a first storage device configured to store data, in accordance with a first policy defining a procedure of saving the collection target data into the first storage device, the area being specified by use of the tag information assigned, wherein the first policy includes information for specifying a storage area into which saved data associated with a piece of the tag information are saved in the first storage device, and information indicating a saving method used for saving the saved data into the storage area, wherein the processing of the saving the one or more areas comprises saving the saved data into the first storage device, in accordance with the saving method included in the first policy, and wherein the first policy includes at least one of save not required, ring buffer, duplicate and append, wherein the processing of the saving the one or more areas comprises saving the saved data that indicates a relation between the tag information, save-target data that are included in the one or more areas assigned with the tag information, and record timing information, into the first storage device, the record timing information indicating a timing when the saved data is recorded, wherein the processing of the assigning comprises assigning the tag information with respect to the one or more areas included in the collection target data, in accordance with mapping data indicating a relation between information for specifying the one or more areas which are included in the collection target data, and the tag information for identifying the area, and further causing the computer to perform:
extracting one or more pieces of the saved data saved in the first storage device,
extracting the tag information, being set to the piece of the saved data, and the save-target data, for each of the extracted one or more pieces of the saved data, and generating, by referring to the mapping data, reproduction data in which the extracted save-target data are arranged in an area associated with the extracted tag information, in accordance with the reproduction data generated in a data reader, loading data, stored in the memory unit in the analysis target device, into a memory unit in a reproduction target device, when the reproduction data include the data stored in the memory unit in the analysis target device, and in accordance with the reproduction data generated in the data reader, loading data, included in the reproduction data and representing an operating state of the processor in the analysis target device, into a processor in the reproduction target device, when the reproduction data include the data representing the operating state of the processor in the analysis target device, and controlling an analysis apparatus to function as:
at least a same number of players as a plurality of the reproduction target devices, when a plurality of the reproduction target devices exist,
wherein the players different from one another among a plurality of the players are communicably connected to the respective reproduction target devices among the plurality of the reproduction target devices, and
in accordance with the reproduction data generated in the respective data reader, each of the plurality of the players performing,
loading data stored in the memory unit in the analysis target device into a memory unit in the reproduction target device connected to a player, when the data stored in the memory unit in the analysis target device are included in the reproduction data, and
loading data representing an operating state of the processor in the analysis target device into a processor in the reproduction target device connected to the player, when data representing the operating state of the processor in the analysis target device are included in the reproduction data.

* * * * *